US009137390B2

(12) United States Patent
Shibata

(10) Patent No.: US 9,137,390 B2
(45) Date of Patent: Sep. 15, 2015

(54) COMMUNICATION APPARATUS

(71) Applicant: Takeshi Shibata, Nagoya (JP)

(72) Inventor: Takeshi Shibata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/039,177

(22) Filed: Sep. 27, 2013

(65) Prior Publication Data
US 2014/0092421 A1    Apr. 3, 2014

(30) Foreign Application Priority Data
Sep. 28, 2012    (JP) .................................. 2012-218087

(51) Int. Cl.
H04N 1/00    (2006.01)
H04N 1/44    (2006.01)
H04N 1/327   (2006.01)
H04N 1/333   (2006.01)

(52) U.S. Cl.
CPC ....... *H04N 1/00103* (2013.01); *H04N 1/00233* (2013.01); *H04N 1/00307* (2013.01); *H04N 1/32776* (2013.01); *H04N 1/33307* (2013.01); *H04N 1/4413* (2013.01); *H04N 2201/0015* (2013.01); *H04N 2201/0036* (2013.01); *H04N 2201/0055* (2013.01); *H04N 2201/0094* (2013.01)

(58) Field of Classification Search
CPC .......... H04N 1/00233; H04N 1/32776; H04N 1/4413; H04N 1/00103
See application file for complete search history.

(56) References Cited

U.S. PATENT DOCUMENTS

| 7,742,786 | B2 | 6/2010 | Watanabe |
| 2006/0034234 | A1 | 2/2006 | Watanabe |
| 2006/0194609 | A1* | 8/2006 | Matsuo ...................... 455/552.1 |
| 2010/0272083 | A1* | 10/2010 | Itoh et al. ...................... 370/338 |

FOREIGN PATENT DOCUMENTS

JP    2006-054577 A    2/2006

OTHER PUBLICATIONS

Wi-Fi Alliance Technical Committee P2P Task Group, "Wi-Fi Peer-to-Peer (P2P) Technical Specification", Version 1.1, Oct. 2010, pp. 1-159.

* cited by examiner

*Primary Examiner* — Saeid Ebrahimi Dehkord
*Assistant Examiner* — Lennin Rodriguezgonzale
(74) *Attorney, Agent, or Firm* — Banner & Witcoff, Ltd.

(57) ABSTRACT

A communication apparatus includes a processor to perform determining whether a current state of the communication apparatus is a master station state or a slave station state; controlling to perform, in a first case where it is determined that the current state of the communication apparatus is the master station state, a first type communication with the target apparatus to enable the target apparatus to participate in the specific wireless network, and controlling to transmit, in a second case where it is determined that the current state of the communication apparatus is the slave station state, transmits a communication request to perform a second type communication to enable the target apparatus to participate in the specific wireless network between the master station apparatus and the target apparatus.

10 Claims, 9 Drawing Sheets

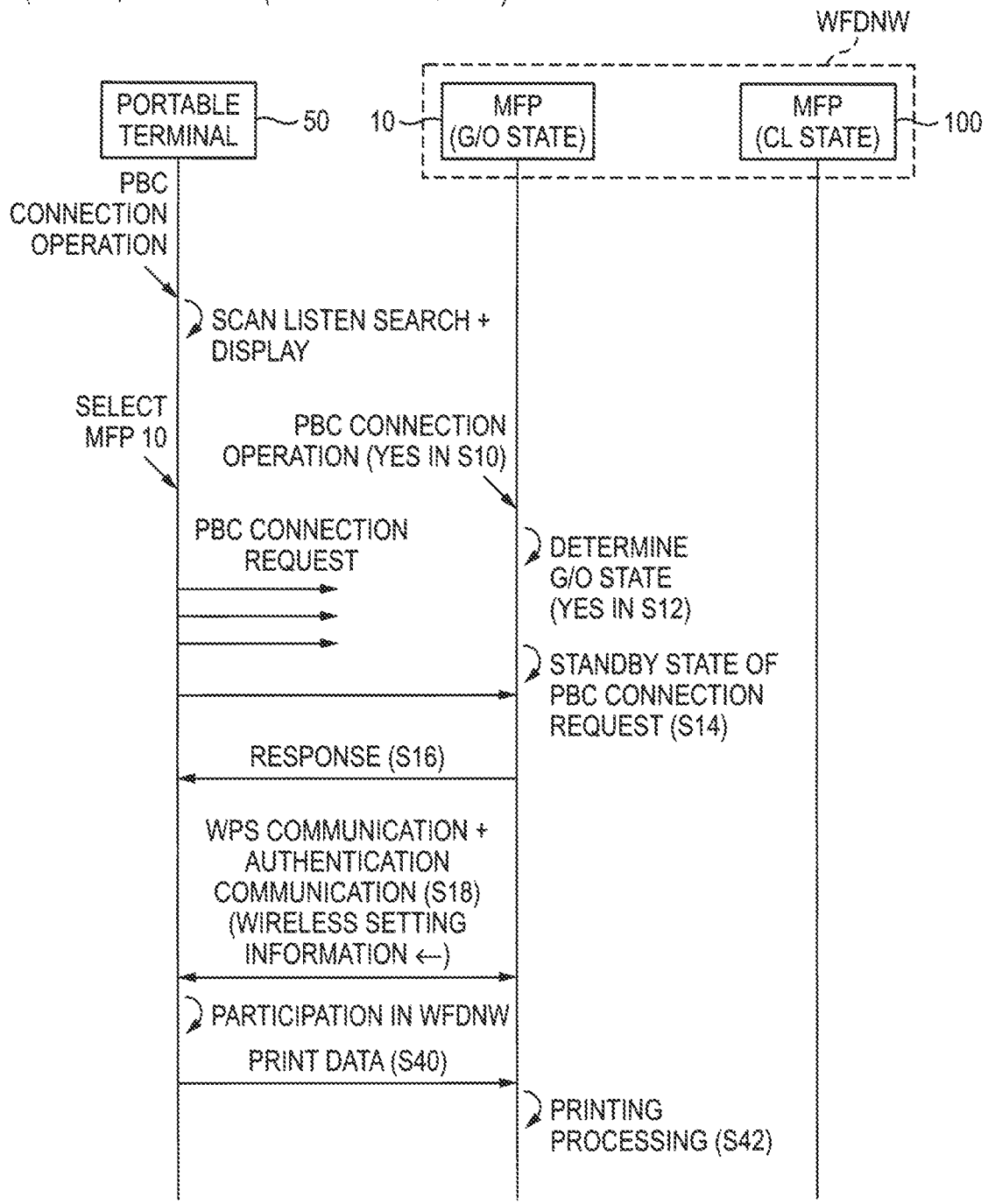

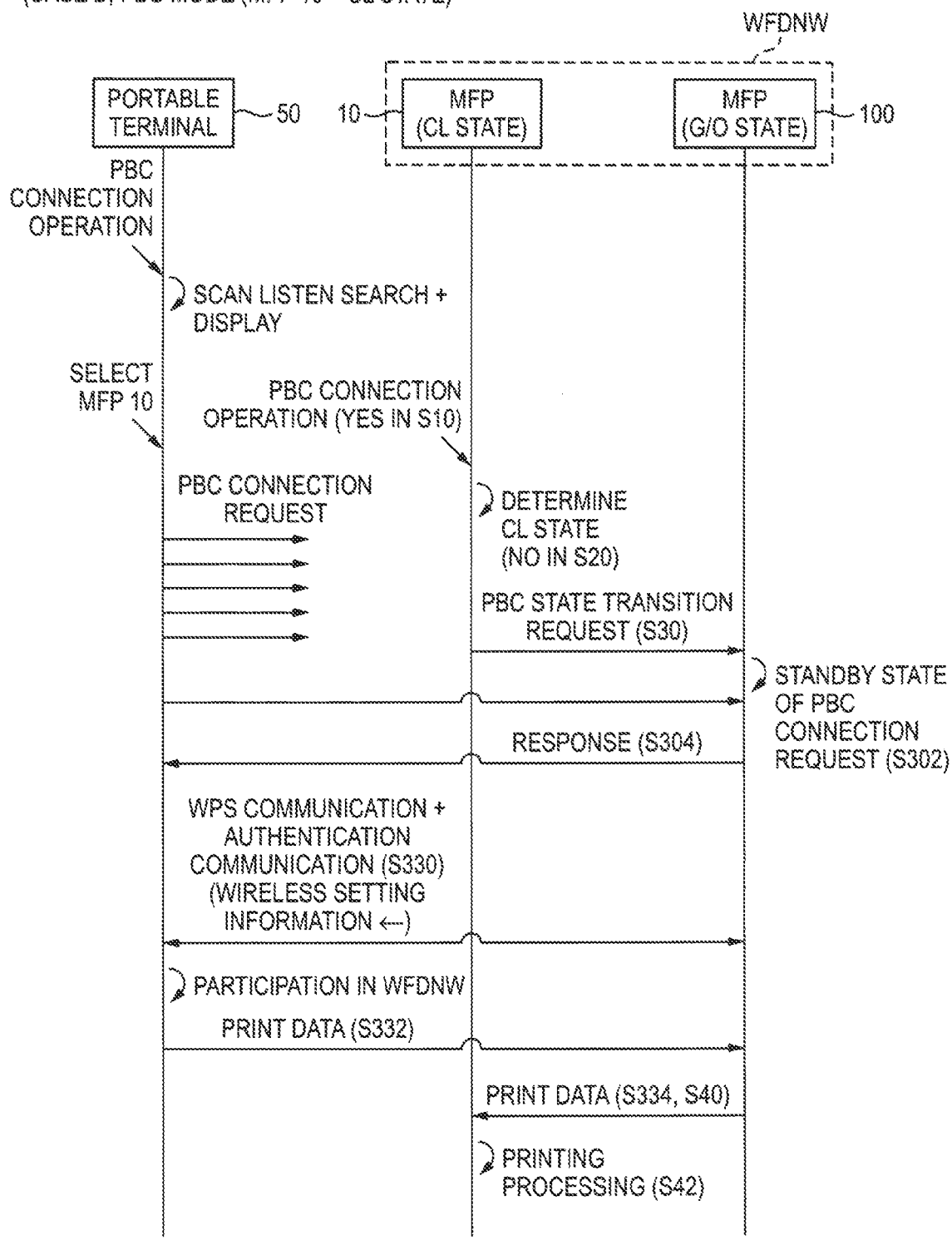

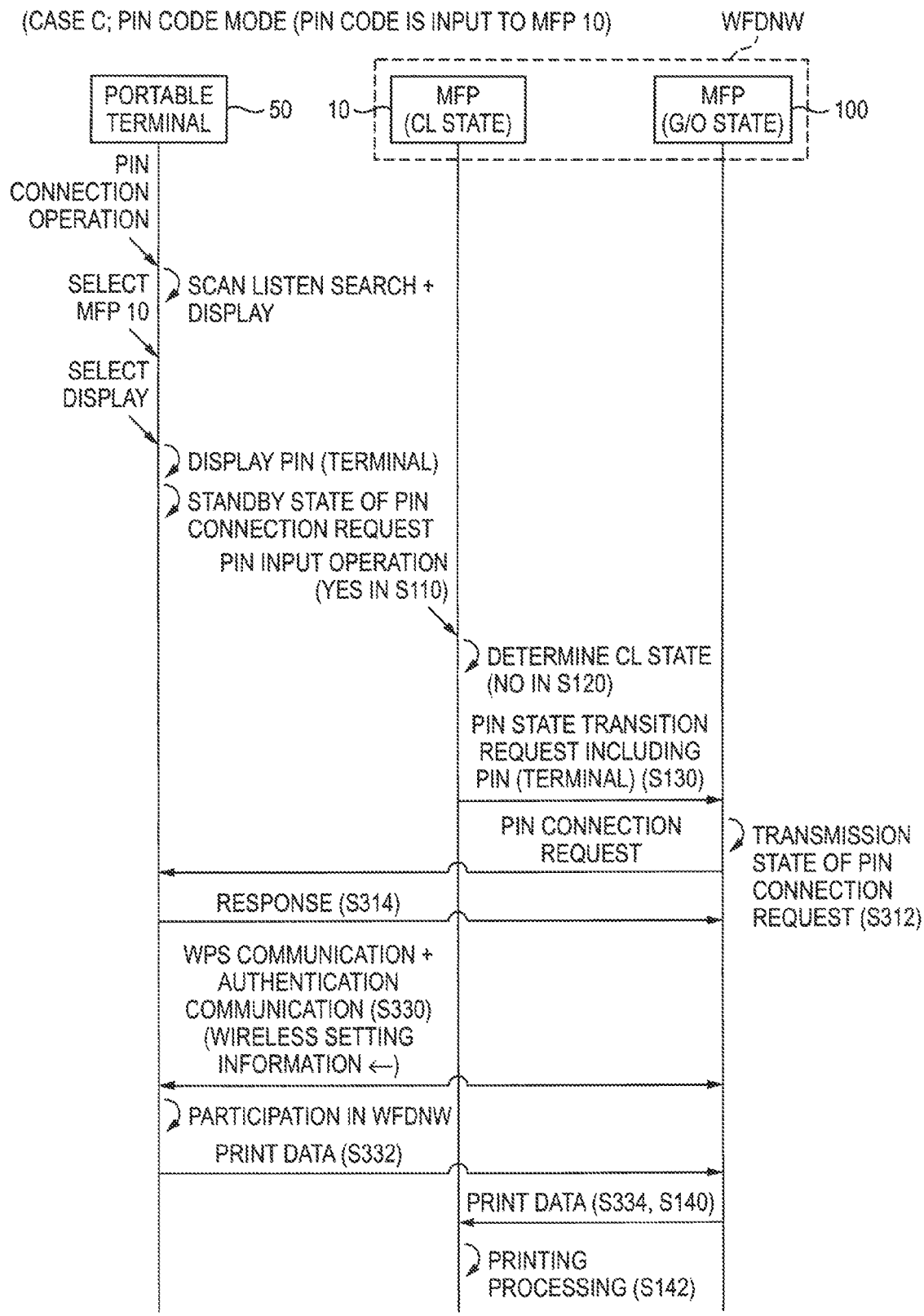

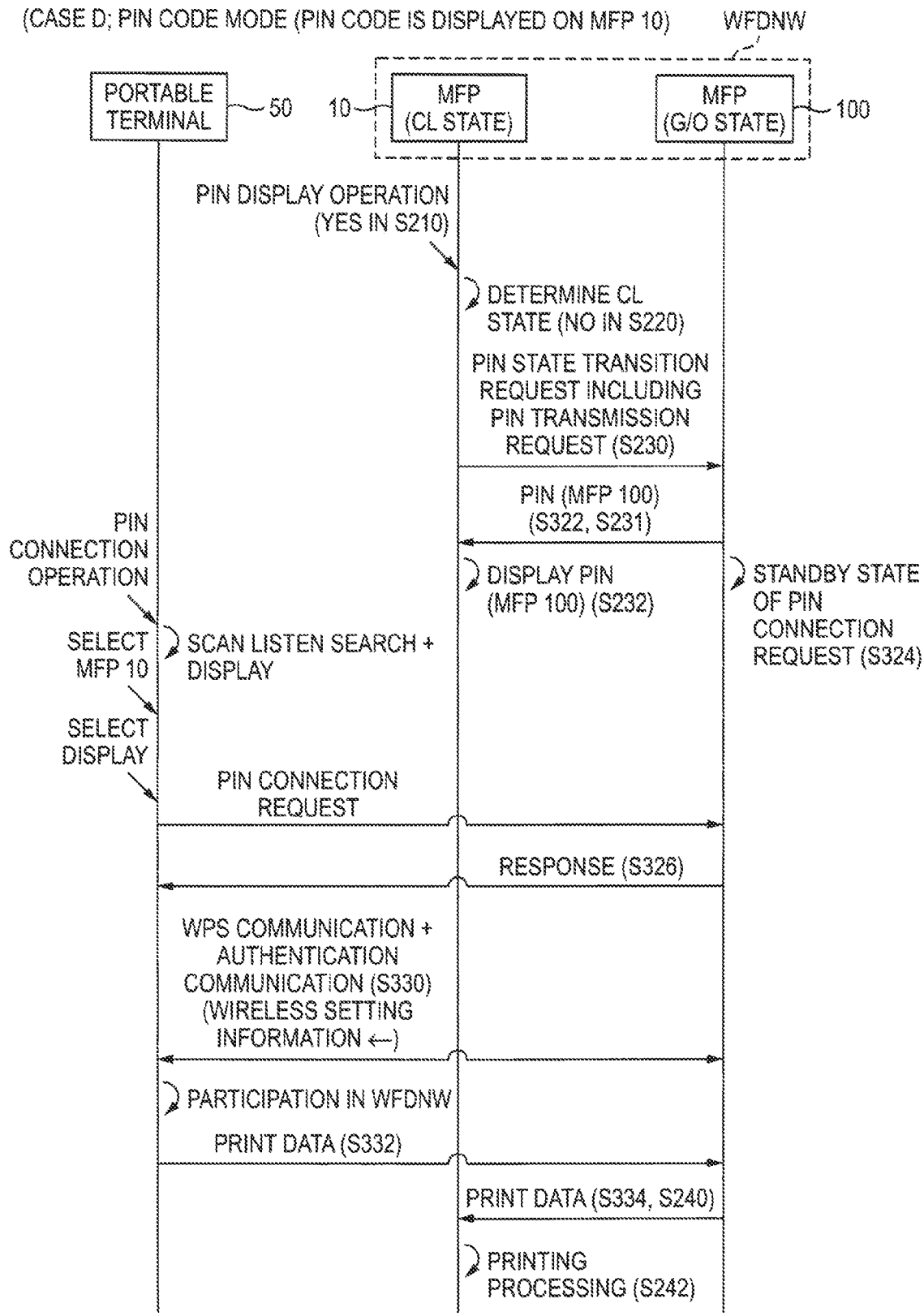

COMMUNICATION APPARATUS

CROSS-REFERENCE TO RELATED APPLICATION

This application claims priority from Japanese Patent Application No. 2012-218087 filed on Sep. 28, 2012, the entire subject matter of which is incorporated herein by reference.

TECHNICAL FIELD

This discloser discloses a communication apparatus that can belong to a wireless network.

BACKGROUND

There is a technology relating to wireless communication based on a WFD (Wi-Fi Direct) mode. In the WFD mode, a pair of wireless communication apparatuses performs wireless communication referred to as G/O (Group Owner) negotiation when establishing a new wireless network. Thereby, it is determined that one wireless communication apparatus operates as a G/O device of the wireless network and the other wireless communication apparatus operates as a client device of the wireless network.

SUMMARY

This specification discloses a technology enabling a communication apparatus, which belongs to a wireless network, to perform processing in accordance with a state of the communication apparatus, thereby appropriately enabling a target apparatus to participate in the wireless network.

In view of the above, a communication apparatus according to one aspect of this disclosure includes a processor and memory storing instructions that, when executed by the processor, causes the processor to perform: determining a current state of the communication apparatus when a specific instruction to enable a target apparatus to participate in a specific wireless network is provided at a state where the communication apparatus belongs to the specific wireless network, wherein the current state is determined as one of a plurality of states including a master station state and a slave station state, the master station state being a state where the communication apparatus operates as the master station of the specific wireless network, the slave station state being a state where the communication apparatus operates as the slave station of the specific wireless network; controlling a first communication to perform a first type communication with the target apparatus to enable the target apparatus to participate in the specific wireless network in a first case where it is determined that the current state is the master station state; and controlling a second communication to transmit a communication request to a master station apparatus operated as the master station of the specific wireless network in a second case where it is determined that the current state is the slave station state, wherein the communication request is a request to perform a second type communication to enable the target apparatus to participate in the specific wireless network between the master station apparatus and the target apparatus.

According to the above configuration, in case of the first case where it is determined that a state of the communication apparatus is the master station state, the communication apparatus performs the first type communication with the target apparatus, thereby enabling the target apparatus to participate in the specific wireless network. On the other hand, in case of the second case where it is determined that a state of the communication apparatus is the slave station state, the communication apparatus transmits the communication request to the master station apparatus. Thereby, since the master station apparatus and the target apparatus can perform the second type communication, the target apparatus can participate in the specific wireless network. Like this, the communication apparatus can appropriately enable the target apparatus to participate in the specific wireless network by executing the processing depending on whether the state of the communication apparatus is the master station state or slave station state.

Further, a communication apparatus according to one aspect of this disclosure includes a processor and memory storing instructions that, when executed by the processor, causes the processor to perform: receiving a communication request from a slave station of the specific wireless network at a state where the communication apparatus operates as a master station and belongs to a specific wireless network, wherein the communication request is a request to perform specific communication to enable a target apparatus to participate in the specific wireless network between the communication apparatus and the target apparatus, and controlling to perform the specific communication to enable the target apparatus to participate in the specific wireless network when the communication request is received.

A control method, a computer program and a computer-readable recording medium storing the computer program for implementing the communication apparatus are also novel and useful. Also, a communication system including two or more devices of the communication apparatus, the target apparatus, the master station apparatus and the slave station apparatus is also novel and useful.

BRIEF DESCRIPTION OF THE DRAWINGS

The foregoing and additional features and characteristics of this disclosure will become more apparent from the following detailed descriptions considered with the reference to the accompanying drawings, wherein:

FIG. 6 is a sequence diagram illustrating an aspect where an MFP at a G/O state causes a portable terminal to participate in a wireless network in accordance with a PBC mode;

FIG. 7 is a sequence diagram illustrating an aspect where the MFP at a CL state causes the portable terminal to participate in the wireless network in accordance with the PBC mode;

FIG. 8 is a sequence diagram illustrating an aspect where the MFP at the CL state causes the portable terminal to participate in the wireless network in accordance with a PIN code mode; and FIG. 9 is a sequence diagram illustrating an aspect where the MFP at the CL state causes the portable terminal to participate in the wireless network in accordance with the PIN code mode.

DETAILED DESCRIPTION (Configuration of Communication System 2)

Figure 1:
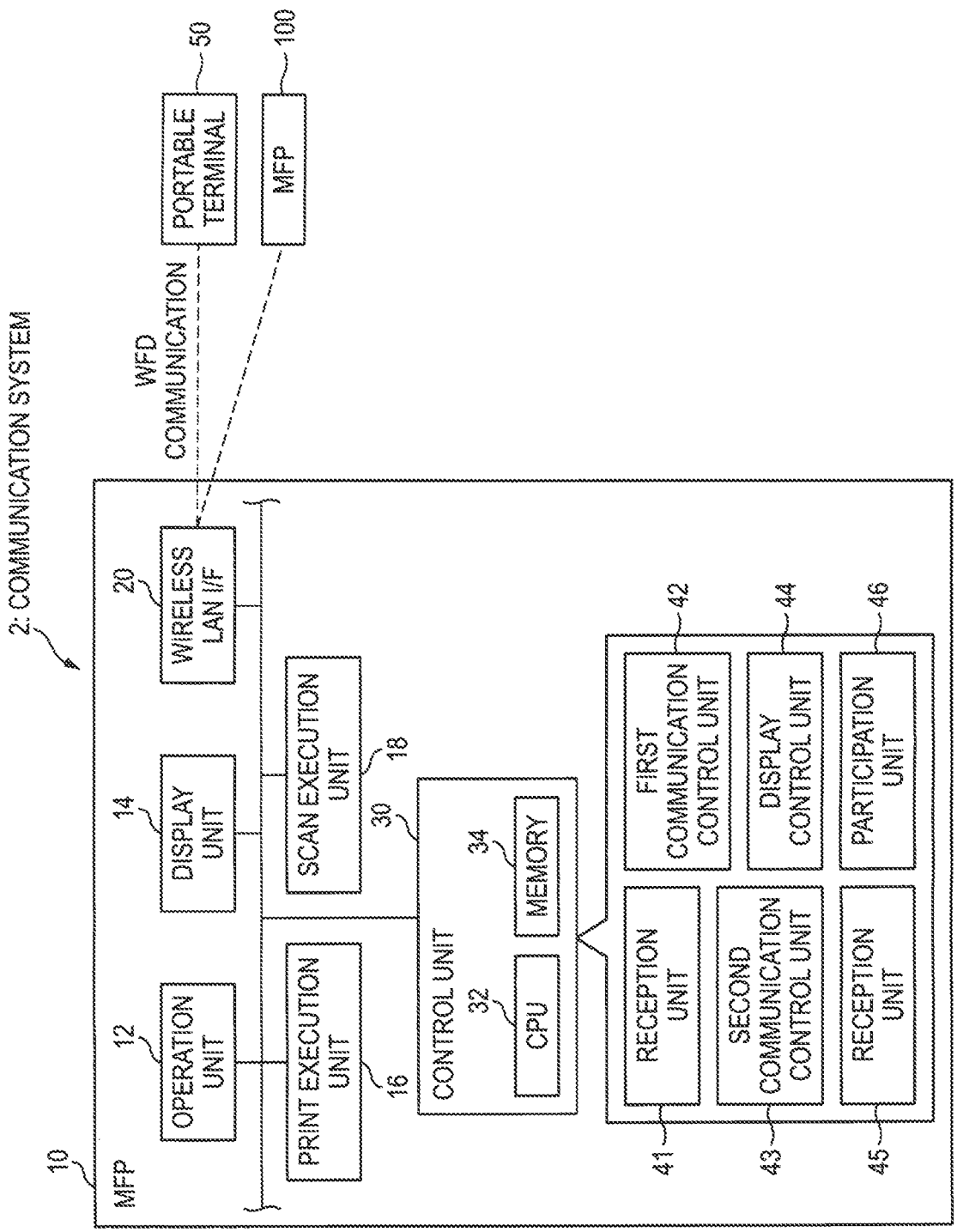
FIG. 1 illustrates a configuration of a communication system.

As shown in FIG. 1, a communication system 2 includes a plurality of multifunctional devices (hereinafter, referred to as 'MFP (Multi-Function Peripheral)') 10, 100 and a portable terminal 50.

(Configuration of MFP 10)

The MFP 10 is a peripheral device that can execute multi-functions including printing and scan functions. The MFP 10 has an operation unit 12, a display unit 14, a print execution unit 16, a scan execution unit 18, a wireless LAN interface 20 (hereinafter, an interface is referred to as 'I/F') and a control unit 30. The respective units 12 to 30 are connected to a bus line (a reference numeral thereof is omitted).

The operation unit 12 has a plurality of keys. A user can input a variety of instructions to the MFP 10 by operating the operation unit 12. The display unit 14 is a display for displaying a variety of information. The print execution unit 16 is a print mechanism such as inkjet type and laser type. The scan execution unit 18 is a scan mechanism such as CCD and CIS.

The wireless LAN I/F 20 is an interface for performing wireless communication and is physically one interface (i.e., one IC chip). The wireless LAN I/F 20 is allotted with both a MAC address (hereinafter, referred to as 'WFDMAC') that is used in wireless communication (hereinafter, referred to as 'WFD communication') based on a WFD (Wi-Fi Direct) mode and a MAC address (hereinafter, referred to as 'normal Wi-FiMAC') that is used in wireless communication (hereinafter, referred to as 'normal Wi-Fi communication') based on a normal Wi-Fi mode.

Specifically, the wireless LAN I/F 20 is beforehand allotted with the normal Wi-FiMAC. The control unit 30 generates a WFDMAC different from the normal Wi-FiMAC by using the normal Wi-FiMAC and allots the same to the wireless LAN I/F 20. Therefore, the control unit 30 can execute both the normal Wi-Fi communication using the normal Wi-FiMAC and the WFD communication using the WFDMAC at the same time.

The control unit 30 has a CPU 32 and a memory 34. The CPU 32 executes a variety of processing (for example, respective processing shown in FIG. 2, which will be described later) in response to programs stored in the memory 34. The CPU 32 executes the processing in response to the programs, so that respective functions of respective units 41 to 45 are implemented. The memory 34 is configured by a ROM, a RAM, a hard disk drive and the like.

(WFD and Normal Wi-Fi)

As described above, from a viewpoint of the MAC address that is used by the MFP 10, the WFD communication and the WFD mode are wireless communication and a wireless communication mode in which the WFDMAC is used, respectively. Also, the normal Wi-Fi communication and the normal Wi-Fi mode are wireless communication and a wireless communication mode in which the normal Wi-FiMAC is used, respectively.

(WFD)

The WFD mode is a wireless communication mode that is described in the written standard 'Wi-Fi Peer-to-Peer (P2P) Technical Specification Version 1.1' prepared by the Wi-Fi Alliance. The WFD mode is a wireless communication mode for performing wireless communication, based on IEEE (The Institute of Electrical and Electronics Engineers, Inc.) 802.11 standards and standards (for example, 802.1a, 11b, 11g, 11n and the like) acting on the 802.11 standards.

When using the normal Wi-FiMAC, the MFP 10 cannot belong to the wireless network in accordance with the WFD mode. However, when using the WFDMAC, the MFP 10 can belong to the wireless network in accordance with the WFD mode. In the below, a device that can belong to the wireless network in accordance with the WFD mode, such as the MFP 10, is referred to as 'WFD compatible device'. In the written standards of the WFD, three states of a Group Owner state (hereinafter, referred to as 'G/O state'), a client state (hereinafter, referred to as 'CL state') and a device state are defined as the WFD compatible device state. The WFD compatible device can selectively operate at one of the three states.

When a pair of WFD compatible devices at the device state should newly establish a wireless network, the pair of WFD compatible devices normally performs wireless communication referred to as G/O negotiation. In the G/O negotiation, one of the pair of WFD compatible devices determines that it is at the G/O state (i.e., a G/O device) and the other determines that it is at the CL state (i.e., a CL device). After that, the pair of WFD compatible devices establishes connection to thereby establish a wireless network. In the below, a wireless network that is established as a result of the G/O negotiation is referred to as 'WFDNW'.

In a step where a WFDNW is newly established by the G/O negotiation, only one G/O device and one CL device belong to the WFDNW. At this time, the G/O device may establish connection with other device to thus cause the other device to newly participate in the WFDNW, as a CL device. In this case, two or more CL devices belong to the WFDNW. That is, in the WFDNW, one G/O device and one or more CL devices may exist. The G/O device manages one or more CL devices. Specifically, the G/O device registers MAC addresses of one or more CL devices with a management list in a memory of the G/O device. Also, when a CL device is disconnected from the WFDNW, the G/O device deletes the MAC address of the CL device from the management list. In the meantime, when the number of the CL devices becomes zero (that is, when the number of the MAC addresses of the CL devices registered with the management list becomes zero), the G/O device is shifted from the G/O state to the device state and extinguishes the WFDNW.

The G/O device can perform wireless communication of target data with the CL device registered with the management list, without going through the other device. The target data is data including information of a network layer of an OSI reference model and information of an upper layer (for example, an application layer) of the network layer, and includes print data, scan data and the like, for example. Also, the G/O device can relay wireless communication of the target data between the CL devices. In other words, the pair of CL devices can perform wireless communication of the target data through the G/O device.

As described above, in the WFDNW, it is possible to perform wireless communication of the target data between the WFD compatible device of a transmission source of the target data and the WFD compatible device of a transmission destination of the target data, without going through an AP (Access Point) separately configured from the WFD compatible devices. That is, it can be said that the WFD communication and the WFD mode are wireless communication without going through an AP and a wireless communication mode in which an AP is not used. In the meantime, the AP is a normal AP that is referred to as a wireless access point, a wireless LAN router and the like, and is different from a G/O device of the WFD mode and a so-called SoftAP of the normal Wi-Fi mode.

Also, the G/O device cannot perform wireless communication of the target data with a device-state device (i.e., the WFD compatible device at the device state) but can perform wireless communication of connection data for establishing connection with the device-state device. That is, the G/O device can perform wireless communication of connection data with the device-state device to thereby establish connection with the device-state device, thereby enabling the device-state device to newly participate in the WFDNW. In other words, the device-state device can perform wireless communication of connection data with the G/O device to thus establish connection with the G/O device, thereby newly participating in the WFDNW. In this case, the device-state device is shifted from the device state to the CL state (i.e., the device-state device participates in the WFDNW as a CL device). The connection data is data (i.e., data not including information of the network layer) including information of a lower layer (for example, a physical layer and a data link layer) of the network layer of the OSI reference model, and includes a Probe Request signal, a Probe Response signal, an Association Request signal, an Association Response signal, an Authentication Request signal, an Authentication Response signal, a 4-Way Handshake signal and the like.

Also, the G/O device cannot perform wireless communication of the target data with a WFD non-compatible device but can perform wireless communication of the connection data with a WFD non-compatible device. The WFD non-compatible device is a device that cannot belong to a wireless network in accordance with the WFD mode but can belong to a wireless network in accordance with the normal Wi-Fi mode. The G/O device can perform wireless communication of the connection data with the WFD non-compatible device to thereby establish connection with the WFD non-compatible device, thereby enabling the WFD non-compatible device to newly participate in the WFDNW. In other words, the WFD non-compatible device can perform wireless communication of the connection data with the G/O device to thus establish connection with the G/O device, thereby newly participating in the WFDNW. The WFD non-compatible device does not selectively operate at any one of the three states (i.e., the G/O state, the CL state and the device state) but operates at the same state as the CL state while it belongs to the WFDNW.

As described above, the G/O device can establish connection with the device-state device or WFD non-compatible device, thereby enabling the device-state device or WFD non-compatible device to newly participate in the WFDNW. However, unlike the G/O device, the CL device cannot establish connection with the device-state device or WFD non-compatible device to thereby cause the device-state device or WFD non-compatible device to newly participate in the WFDNW.

(Normal Wi-Fi)

The normal Wi-Fi mode is a wireless communication mode that is defined by the Wi-Fi Alliance and is different from the WFD mode. The normal Wi-Fi mode is a wireless communication mode that performs wireless communication in accordance with IEEE 802.11 standards and standards (for example, 802.11a, 11b, 111g, 11n and the like) acting on the 802.11 standards, like the WFD mode.

However, as described above, while the WFD mode is a wireless communication mode for normally performing wireless communication without going through an AP, the normal Wi-Fi mode is a wireless communication mode for normally performing wireless communication through an AP. Also, while the WFD mode is a wireless communication mode having a mechanism of G/O negotiation, the normal Wi-Fi mode is a wireless communication mode having no the mechanism. Also, while the WFD mode is a wireless communication mode allowing a selective operation at any one of the three states (i.e., the G/O state, the CL state and the device state), the Wi-Fi mode is a wireless communication mode not allowing the selective operation. In these regards, the WFD mode is different from the normal Wi-Fi mode.

The MFP 10 can establish connection based on the normal Wi-Fi mode between an AP and the MFP 10 by using the normal Wi-FiMAC. Thereby, the MFP 10 can newly participate in a wireless network (hereinafter, referred to as 'normal Wi-FiNW') that is established by the AP. In this process, the MFP 10 does not execute the G/O negotiation and does not selectively determine an operation of the G/O state or CL state. The MFP 10 can perform wireless communication of the target data with another device belonging to the normal Wi-FiNW through the AP. In the meantime, the AP registers MAC addresses of the respective devices connected to the AP with a management list of the AP.

As described above, the MFP 10 can establish connection (i.e., wireless connection) based on the WFD mode or normal Wi-Fi mode between the MFP 10 and the other devices (for example, the device-state device, the AP and the like). The wireless connection mode that is supported by the MFP 10 includes a push button mode (hereinafter, referred to as 'PBC mode') of WPS (Wi-Fi Protected Setup) and a PIN code mode of WPS.

(PBC Mode)

The PBC mode of WPS is a mode for establishing wireless connection between a pair of devices by supplying (i.e., performing WPS communication) wireless setting information from one device to the other device, even though a PIN code is not displayed and input in the pair of devices when a predetermined operation is executed in each of the pair of devices. The wireless setting information is setting information that is used in the wireless network (WFDNW, normal Wi-FiNW and the like), and includes an authentication mode, an encryption mode, a password, an SSID (Service Set Identifier), a BSSID (Basic Service Set Identifier) and the like. Meanwhile, in a modified embodiment, the MFP 10 may support an AOSS (registered trademark), an AOSS2, an SES (Secure Easy Setup; registered trademark) and the like, instead of the PBC mode. These are the similar mode to the PBC mode of WPS.

(PIN Code Mode)

The PIN code mode of WPS is a mode for establishing wireless connection between a pair of devices by supplying (i.e., performing WPS communication) wireless setting information from one (or the other) device to the other (or one) device, when a PIN code is displayed on one device and the PIN code is input in the other device. Meanwhile, in a modified embodiment, the MFP 10 may support another type of PIN code mode, instead of the PIN code mode of WPS.

(Information to be Stored in Memory 34 of MFP 10)

The memory 34 of the MFP 10 stores therein a WFD state value indicating a current state (i.e., the G/O state, the CL state or the device state) of the MFP 10 relating to the WFD mode. Also, when the MFP 10 belongs to the WFDNW, the memory 34 stores therein wireless setting information (hereinafter, referred to as WDFWSI (WFD Wireless Setting Information)) that is used in the WFDNW. When the MFP 10 belongs to the normal Wi-FNW, the memory 34 also stores therein wireless setting information that is used in the normal Wi-FiNW.

(Configurations of Other Devices)

The MFP 100 has the same configuration as the MFP 10. That is, the MFP 100 can perform WFD communication and normal Wi-Fi communication. Like the MFP 10, the MFP 100 can execute respective processing shown in FIGS. 2 to 5.

The portable terminal 50 is a portable terminal apparatus such as a portable phone (for example, smart phone), a PDA, a notebook PC, a tablet PC, a portable music reproduction apparatus, a portable moving picture reproduction apparatus and the like. The portable terminal 50 can perform WFD communication and normal Wi-Fi communication.

The portable terminal 50 stores therein an application (hereinafter, referred to as 'application for MFP') for enabling the MFP 10 to execute functions (for example, print function, scan function and the like). The application for MFP may be installed into the portable terminal 50 from a server, which is provided by a vendor of the MFPs 10, 100, or may be installed into the portable terminal 50 from a media, which is shipped together with the MFPs 10, 100.

(Processing that is Executed by MFP 10)

Subsequently, processing that is executed by the MFP 10 is described with reference to FIGS. 2 to 5. In below descriptions, a situation is assumed in which a user of the portable terminal 50 at the device state causes the MFP 10 to print an image, which is expressed by data (i.e., print data) stored in the portable terminal 50.

Figure 2:
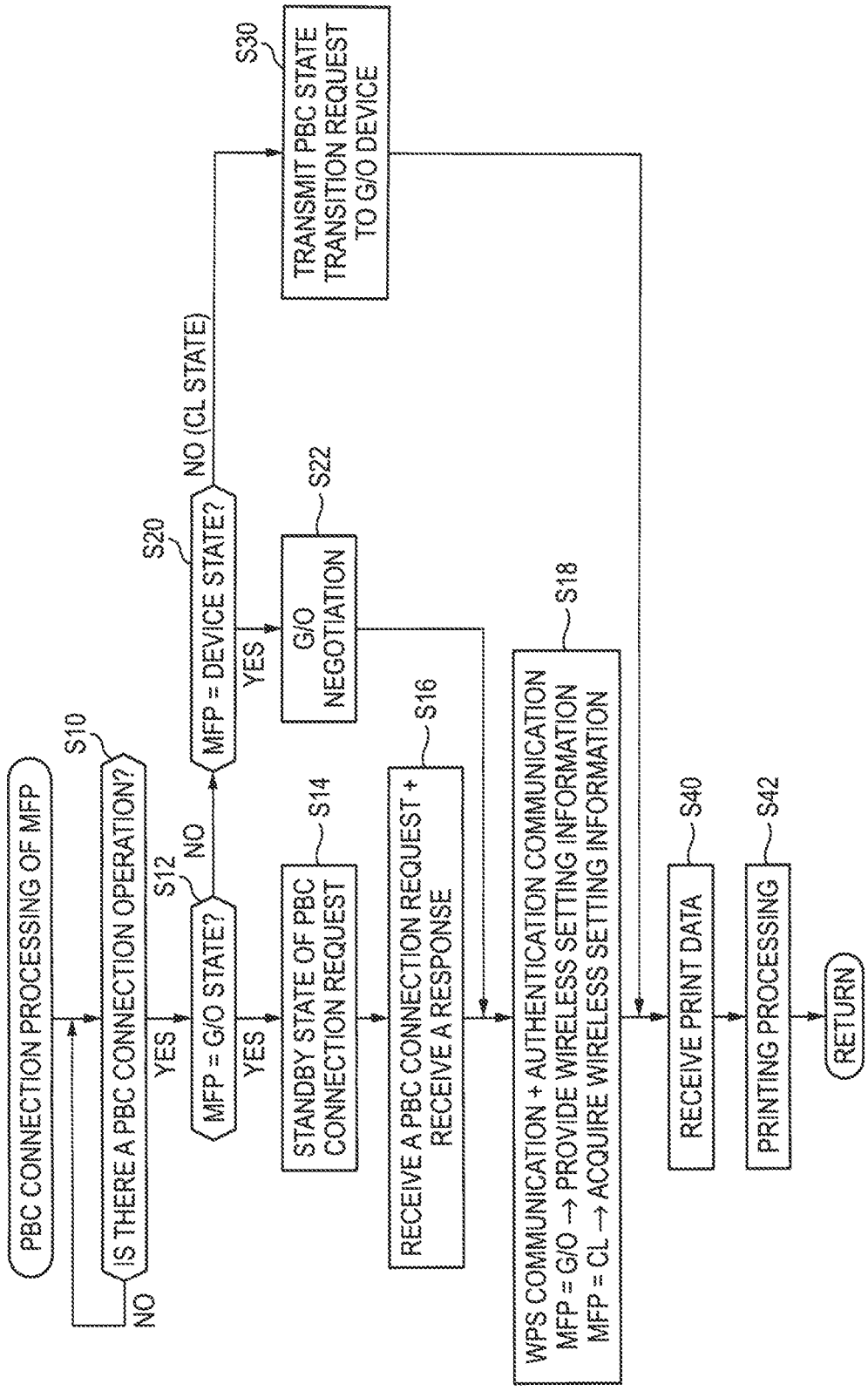
FIG. 2 illustrates a flowchart of PBC connection processing of an MFP.
Figure 3:
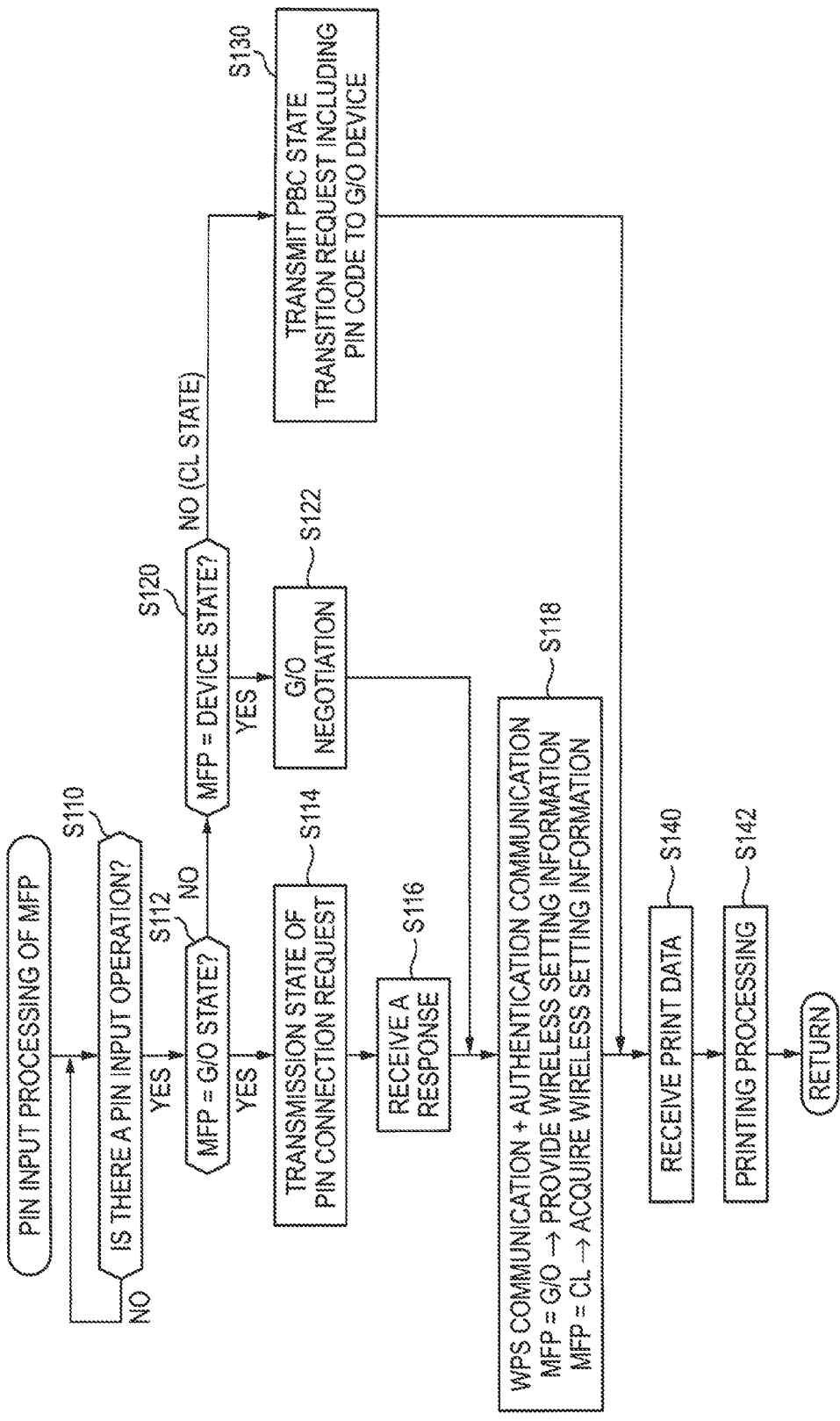
FIG. 3 illustrates a flowchart of PIN input processing of the MFP.
Figure 4:
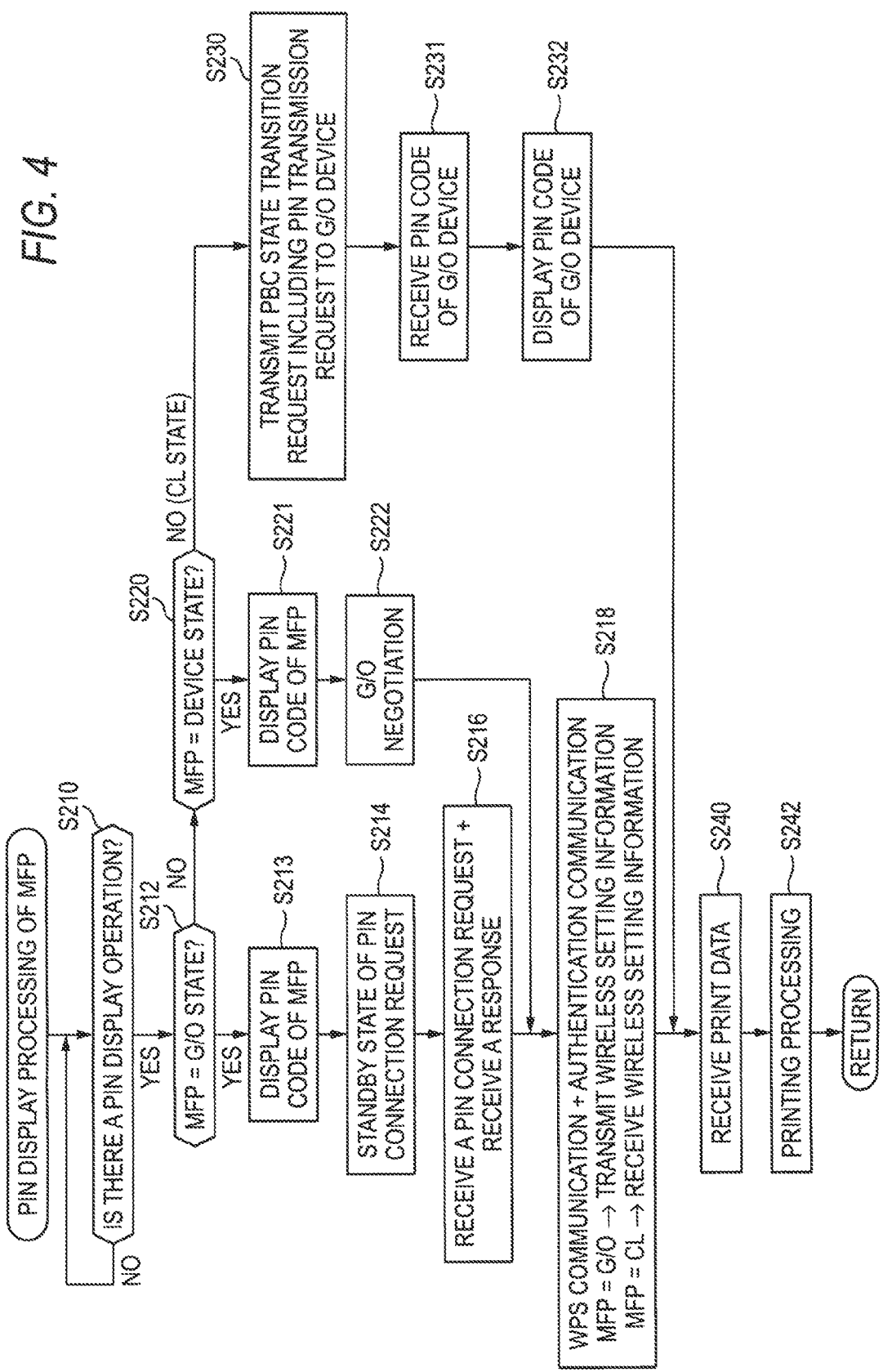
FIG. 4 illustrates a flowchart of PIN display processing of the MFP.

A user of the portable terminal 50 does not normally know a current state (i.e., a G/O state, a CL state or a device state) of the MFP 10. Therefore, when the user wants the MFP 10 to execute a printing operation, based on print data stored in the portable terminal 50, the user may apply an operation (a PBC connection operation, a PIN input operation, a PIN display operation, which will be described later) for wireless connection of the WFD mode to the MFP 10 at a state where the user does not know the state of the MFP 10. FIGS. 2 to 4 show flowcharts that are executed by the MFP 10 in accordance with the operations. In the meantime, when a wireless connection operation of the normal Wi-Fi mode is applied, the MFP 10 establishes connection of the normal Wi-Fi mode between the MFP 10 and the AP in accordance with a well-known mode. The description of this processing is omitted.

(PBC Connection Processing; FIG. 2)

A user selects an item indicating 'wireless connection of the WFD mode' from a plurality of items (for example, 'wireless connection of the WFD mode' and 'wireless connection of the normal Wi-Fi mode') included in a screen that is displayed on the display unit 14 of the MFP 10. Then, the user selects an item indicating 'PBC mode' from a plurality of items (for example, 'PBC mode' and 'PIN code mode') included in the screen that is displayed on the display unit 14 (hereinafter, referred to as 'PBC connection operation'). When the PBC connection operation is applied to the operation unit 12, the control unit 30 of the MFP 10 determines YES in S10 and executes respective processing after S12.

In S12, a determination unit 41 determines whether a current state of the MFP 10 is a G/O state. Specifically, when the WFD state value in the memory 34 is a value indicating the G/O state, the determination unit 41 determines YES in S12 and proceeds to S14. On the other hand, when the WFD state value in the memory 34 is a value indicating the CL state or device state, the determination unit 41 determines NO in S12 and proceeds to S20.

The description that the processing of S14 is executed means that the MFP 10 belongs to the WFDNW (hereinafter, referred to as 'WFDNW (MFP 10=/G/O)'), as a G/O device. The MFP 10 at the G/O state has authority of supplying the WFDWSI, which is currently used in the WFDNW (MFP 10=G/O), to the portable terminal 50 at the device state and thus establishing connection between the MFP 10 and the portable terminal 50. That is, the MFP 10 at the G/O state has authority of enabling the portable terminal 50 at the device state to participate in the WFDNW (MFP 10=G/O). Therefore, in S14 to S18, the MFP 10 at the G/O state executes processing for enabling the portable terminal 50 at the device state to participate in the WFDNW (MFP 10=G/O).

In S14, a first communication control unit 42 shifts the MFP 10 to a standby state of a connection request (i.e., Association Request signal; hereinafter, referred to as 'PBC connection request') for requesting connection establishment of the PBC mode. When a device (for example, the MFP 10) is at the standby state of the PBC connection request, the device can receive a PBC connection request from a device of a participation target and transmit a response (i.e., Association Response signal) indicating OK. On the other hand, when a device is not at the standby state of the PBC connection request, the device does not transmit the OK response even though it receives a PBC connection request (for example, it transmits a response indicating NG).

The user starts the application for MFP in the portable terminal 50 at the device state. Then, the user selects an item indicating the 'PBC mode' on the screen relating to the application for MFP (i.e., executes the 'PBC connection operation'). In this case, the portable terminal 50 executes an SLS (Scan Listen Search). The SLS is wireless communication for searching one or more neighbor devices (for example, the MFPs 10, 100) exiting in the vicinity of an execution device (for example, the portable terminal 50) executing the SLS, and includes Scan processing, Listen processing and Search processing.

The Scan processing is processing of transmitting a Probe Request signal and receiving a Probe Response signal, thereby searching the G/C) device and the AP existing in the vicinity of the execution device. The Listen processing is processing of receiving the Probe Request signal and transmitting the Probe Response signal, thereby notifying the neighbor device, which exists in the vicinity of the execution device, of the existence of the execution device. The Search processing is processing of transmitting the Probe Request signal and receiving the Probe Response signal, thereby searching a device-state device existing in the vicinity of the execution device. Meanwhile, in the SLS, it is not possible to generally find out a CL device existing in the vicinity of the execution device. The Probe Response signal that is received in the Scan processing and the Search processing includes a MAC address, a device name and the like of the neighbor device. Therefore, the execution device can acquire MAC addresses, device names and the like of one or more neighbor devices.

The portable terminal 50 displays a device list indicating information (the MAC address, the device name and the like) relating to the one or more neighbor devices searched in the SLS. The device list includes information about the MFP 10 at the G/O state. The user selects the MFP 10 from the device list. In this case, the portable terminal 50 transmits a PBC connection request (i.e., Association Request signal) that includes the MAC address (i.e., WFDMAC) of the MFP 10 as a transmission destination.

In S14, the MFP 10 at the G/O state is shifted to the standby state of the PBC connection request. Therefore, in S16, the first communication control unit 42 receives the PBC connection request from the portable terminal 50 and transmits an OK response signal (i.e., Association Response signal) to the portable terminal 50.

As described above, in S10, the PBC connection operation is applied to the MFP 10 and the PBC connection operation is also applied to the portable terminal 50. Therefore, a condition for performing WPS communication of the PBC mode is satisfied. Thus, in S18, the first communication control unit 42 performs WPS communication to thereby transmit the WFDWSI (i.e., WFDWSI in the memory 34), which is currently used in the WFDNW (MFP 10=G/O), to the portable terminal 50.

When the portable terminal 50 acquires the WFDWSI from the MFP 10, the portable terminal requests the MFP 10 to perform authentication communication based on the WFDWSI (i.e., it transmits an Authentication Request signal).

In S18, the first communication control unit 42 also performs the authentication communication (i.e., communication such as 4-Way Handshake signal and the like) in accordance with the authentication request received from the portable terminal 50, thereby executing authentication of the portable terminal 50. Thereby, the first communication control unit 42 establishes connection of the PBC mode between the MFP 10 and the portable terminal 50. Then, the first communication control unit 42 registers a MAC address of the portable terminal 50 with the management list of the MFP 10. Thereby, the portable terminal 50 newly participates in the WFDNW (MFP 10=G/O) as a CL device. When the processing of S18 is over, the processing proceeds to S40.

Meanwhile, in S20, the determination unit 41 determines whether the current state of the MFP 10 is the device state or not. Specifically, when the WFD state value in the memory 34 is a value indicating the device state, the determination unit 41 determines YES in S20 and proceeds to S22. On the other hand, when the WFD state value in the memory 34 is a value indicating the CL state, the determination unit 41 determines NO in S20 and proceeds to S30.

In S22 (i.e., MFP 10=device state), the control unit 30 executes processing in accordance with a first situation and a second situation, which will be described later. The first situation is a situation where the PBC connection operation (YES in S10) is applied to the MFP 10 at the device state before the PBC connection operation is applied to the portable terminal 50 at the device state. In this case, in S22, the control unit 30 executes the SLS to thus display a device list, which indicates the information (the MAC address, the device name and the like) relating to the portable terminal 50, on the display unit 14. The user operates the operation unit 12 to thereby select the portable terminal 50 from the device list. In this case, in S22, the control unit 30 transmits a PBC connection request that includes the MAC address of the portable terminal 50 as a transmission destination.

Then, when the PBC connection operation is applied to the portable terminal 50 at the device state, the portable terminal 50 receives the PBC connection request from the MFP 10 and transmits an OK response to the MFP 10. As a result, in S22, the control unit 30 of the MFP 10 receives the OK response from the portable terminal 50. Thereby, the G/O negotiation starts between the MFP 10 and the portable terminal 50.

The second situation is a situation where the PBC connection operation is applied to the portable terminal 50 at the device state before the PBC connection operation is applied to the MFP 10 at the device state. In this case, the portable terminal 50 executes the SLS to thus display a device list, which indicates the information (the MAC address, the device name and the like) relating to the MFP 10. The user operates the portable terminal 50 to thereby select the MFP 10 from the device list. In this case, the portable terminal 50 transmits a PBC connection request that includes the WFDMAC address of the MFP 10 as a transmission destination.

Then, when the PBC connection operation is applied to the MFP 10 at the device state (YES in S10), the control unit 30 of the MFP 10 receives the PBC connection request from the portable terminal 50 and transmits an OK response to the portable terminal 50, in S22. Thereby, the G/O negotiation starts between the MFP 10 and the portable terminal 50.

In the G/O negotiation, the control unit 30 of the MFP 10 transmits information, which indicates a G/O priority of the MFP 10, to the portable terminal 50 and receives information, which indicates a G/O priority of the portable terminal 50, from the portable terminal 50. The G/O priority of the MFP 10 is an index indicating a degree that the MFP 10 should be at the G/O state and is predetermined for the MFP 10. Likewise, the G/O priority of the portable terminal 50 is an index indicating a degree that the portable terminal 50 should be at the G/O state.

The control unit 30 of the MFP 10 compares the G/O priority of the MFP 10 and the G/O priority of the portable terminal 50 to thus determine that a device having a higher priority becomes at the G/O state and that a device having a lower priority becomes at the CL state. The portable terminal 50 determines a state of the portable terminal by using the same method as the MFP 10. When the processing of S22 is over, the processing proceeds to S18.

In S18 that is executed via S22, the control unit 30 executes processing in accordance with a result of the G/O negotiation. That is, in the G/O negotiation, when it is determined that the MFP 10 becomes at the G/O state, the control unit 30 first prepares WFDWSI that should be used in the WFDNW. Specifically, the control unit 30 specifies an authentication mode and an encryption mode, which have been predetermined. The control unit 30 specifies a predetermined password or newly generates a password, thereby preparing a password. The control unit 30 specifies a predetermined SSID or newly generates an SSID, thereby preparing an SSID. In this illustrative embodiment, the control unit 30 specifies the predetermined WFDMAC as a BSSID.

Then, the control unit 30 performs WPS communication to thus supply the prepared WFDWSI to the portable terminal 50. After that, the control unit 30 executes the authentication of the portable terminal 50 in response to the authentication request received from the portable terminal 50, like S18 that is executed via S16. Thereby, the control unit 30 establishes connection of the PBC mode between the MFP 10 and the portable terminal 50. As a result, the MFP 10 newly establishes a WFDNW (MFP 10=G/O) as a G/O device and the portable terminal 50 participates in the WFDNW (MFP 10=G/O) as a CL device.

On the other hand, in the G/O negotiation, when it is determined that the MFP 10 becomes at the CL state, the control unit 30 performs WPS communication to thus acquire the WFDWSI prepared by the portable terminal 50. Then, the control unit 30 requests the portable terminal 50 to perform authentication communication in accordance with the WFDWSI (i.e., the portable terminal 50 executes the authentication of the MFP 10). Thereby, the control unit 30 establishes connection of the PBC mode between the MFP 10 and the portable terminal 50. As a result, the portable terminal 50 newly establishes a WFDNW as a G/O device and the MFP 10 participates in the WFDNW (MFP 10=CL) as a CL device. When the processing of S18 is over, the processing proceeds to S40.

Subsequently, a case where a result of the determination in S20 is NO is described. In a situation where the processing of S30 is executed, the MFP 10 belongs to the WFDNW (MFP 10=CL) as a CL device. Since the MFP 10 at the CL state is not a G/O device, the MFP does not have authority of supplying the WFDWSI, which is currently used in the WFDNW (MFP 10=CL), to the portable terminal 50 and establishing connection between the MFP 10 and the portable terminal 50. That is, the MFP 10 at the CL state does not have the authority of enabling the portable terminal 50 to participate in the WFDNW (MFP 10=CL). Therefore, in S30, the MFP 10 executes processing for establishing between a G/O device (hereinafter, referred to as 'specific G/O device') belonging to the WFDNW (MFP 10=CL) and the portable terminal 50.

That is, in S30, a second transmission control unit 43 transmits a PBC state transition request to the specific G/O device in accordance with an SNMP (Simple Network Management Protocol). The PBC state transition request is a request for shifting a state of the specific G/O device to a standby state of the PBC mode (i.e., a state for responding an OK response to the PBC connection request; refer to S302, S304 in FIG. 5). In S30, the second transmission control unit 43 transmits to the specific G/O device a command of the SNMP for setting a value of a MIB (Management Information Base) of the specific G/O device with a value indicating the standby state of the PBC mode. Meanwhile, in a modified embodiment, the second transmission control unit 43 may transmit the PBC state transition request to the specific G/O device in accordance with another protocol (for example, HTTP (Hyper Text Transfer Protocol)).

In this illustrative embodiment, the specific G/O device is the MFP 100, for example, and can execute processing of FIG. 5 that will be described later. Therefore, when the specific G/O device receives the PBC state transition request from the MFP 10, it is shifted to the standby state of the PBC connection request (refer to S302 of FIG. 5).

Then, when a PBC connection operation is applied to the portable terminal 50 at the device state, the portable terminal 50 executes the SLS to thus display the device list. As described above, in the SLS, it is not possible to generally find out the CL device. However, the portable terminal 50 (i.e., the application for MFP) can find out the CL device. That is, when the portable terminal 50 can find out the specific G/O device, the portable terminal 50 requests the specific G/O device to provide the information (i.e., the MAC address, the device name and the like) relating to the CL device (i.e., the MFP 10) that is managed by the specific G/O device. Therefore, the portable terminal 50 can acquire the information relating to the MFP 10 at the CL state from the specific G/O device, thereby displaying the device list indicating the information relating to the MFP 10 at the CL state. The user operates the portable terminal 50 to thus select the MFP 10 from the device list. In this case, the portable terminal 50 transmits a PBC connection request that includes the WFD-MAC of the MFP 10 as a transmission destination.

Figure 5:
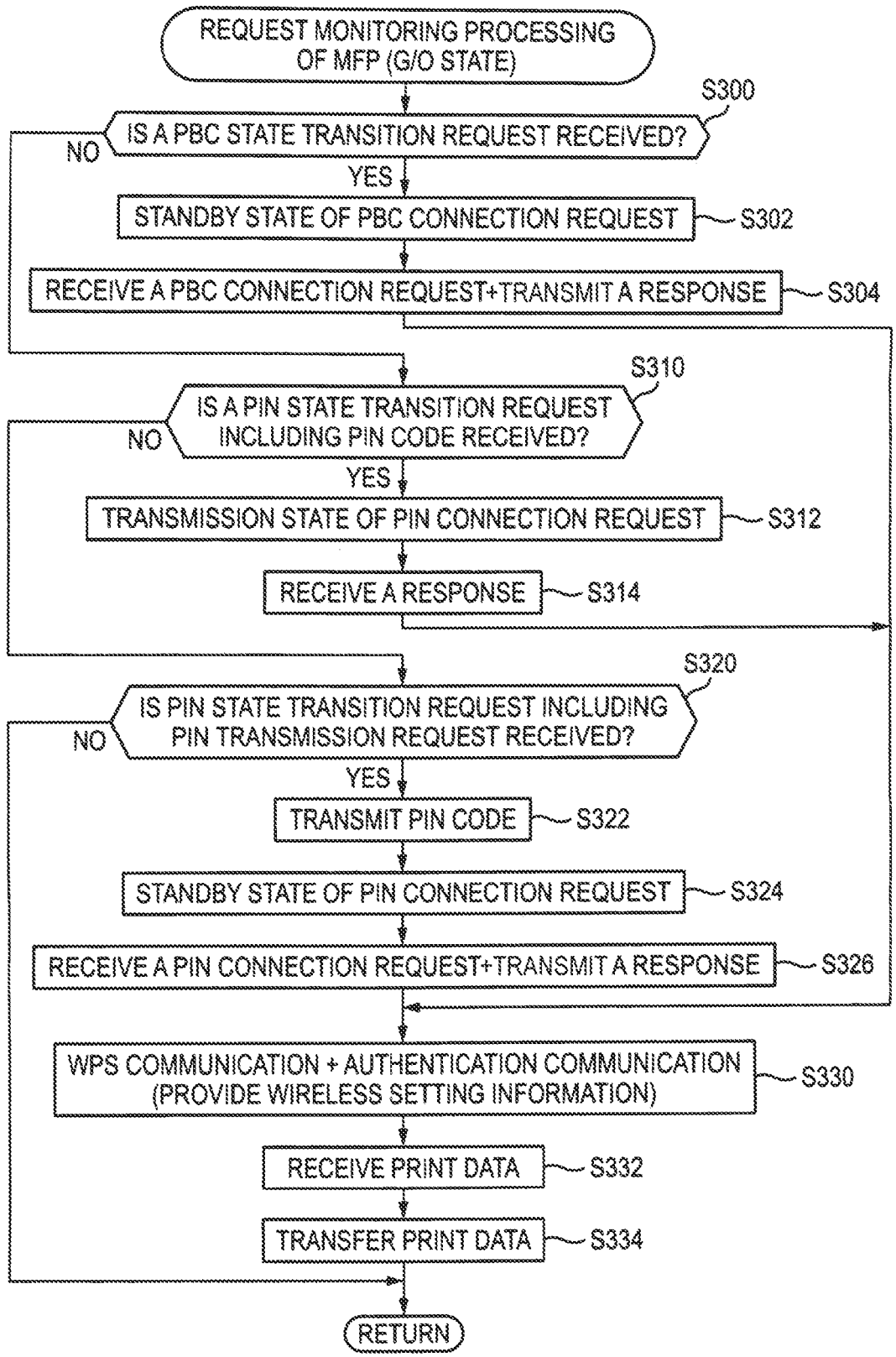
FIG. 5 illustrates a flowchart of request monitoring processing of the MFP.

Since the specific G/O device is shifted to the standby state of the PBC connection request, the specific G/O device receives the PBC connection request from the portable terminal 50 and transmits an OK response to the portable terminal 50 (refer to S304 in FIG. 5). In the meantime, as described above, since the PBC connection request is transmitted from the portable terminal 50, as a result that the MFP 10 is selected from the device list displayed on the portable terminal 50, the PBC connection request includes the WFDMAC of the MFP 10 and does not include the MAC address of the specific G/O device. However, the specific G/O device can transmit an OK response to the portable terminal 50 even though it receives the PBC connection request including the WFDMAC of the MFP 10. That is, a device shifted to a standby state of a connection request can transmit an OK response when it receives a connection request, irrespective of a MAC address (i.e., a MAC address of a device that is designated as a connection destination by the portable terminal 50) included in the connection request. This is the same for a PIN connection request (refer to FIGS. 3 and 4) that will be described later.

Although the PBC connection operation is not applied to the specific G/O device, since the specific G/O device receives the PBC state transition request from the MFP 10 at the CL state and is thus shifted to the standby state of the PBC connection request, a condition for performing WPS communication of the PBC mode is satisfied. Therefore, the specific G/O device performs WPS communication to thereby provide the WFDWSI, which is currently used in the WFDNW (MFP 10=CL), to the portable terminal 50 (refer to S330 in FIG. 5). Then, the specific G/O device executes authentication of the portable terminal 50, in response to the authentication request received from the portable terminal 50 (refer to S330 in FIG. 5). Thereby, the connection of the PBC mode is established between the specific G/O device and the portable terminal 50. As a result, the portable terminal 50 newly participates in the WFDNW (MFP 10=CL), as a CL device.

As described above, in S30, when the MFP 10 transmits the PBC state transition request to the specific G/O device, the portable terminal 50 can participate in the WFDNW (MFP 10=CL), as a LD device. Thereby, a state is established in which the MFP 10 and the portable terminal 50 belong to the same WFDNW (i.e., WFDNW (MFP 10=CL)). When the processing of S30 is over, the processing proceeds to S40.

In S40, the control unit 30 receives print data from the portable terminal 50. The print data is data (for example, image data, web data and the like) stored in the portable terminal 50, and is data that is designated as a print target by the user.

In a situation where the processing of S40 is executed via S14 to S18, the MFP 10 is a G/O device and the portable terminal 50 is a CL device. In this situation, the first communication execution unit 42 receives the print data from the portable terminal 50 without going through the other apparatus. Also, in a situation where the processing of S40 is executed via S22 and S18, one of the MFP 10 and the portable terminal 50 is a G/O device and the other is a CL device. Also in this situation, the control unit 30 receives the print data from the portable terminal 50 without going through the other apparatus. Also, in a situation where the processing of S40 is executed via S30, both the MFP 10 and the portable terminal 50 are CL devices. In this situation, the second communication execution unit 43 receives the print data from the portable terminal 50 through the specific G/O device.

Then, in S42, the control unit 30 supplies the print data to the print execution unit 16. Thereby, the print execution unit 16 prints an image, which is expressed by the print data, on a printing medium. The user of the portable terminal 50 can acquire the printed printing medium. When the processing of S42 is over, the processing returns to S10.

(PIN Input Processing; FIG. 3)

The user starts the application for MFP of the portable terminal 50 at the device state, thereby applying an operation for displaying a PIN code to the portable terminal 50. Specifically, the user selects an item indicating 'wireless connection of the WFD mode' and then selects an item indicating 'PIN code mode' by operating the portable terminal 50 (i.e., the user executes the 'PIN connection operation'). Thereby, the portable terminal 50 executes the SLS to thereby display the device list indicating the information relating to the MFP 10. The user selects the MFP 10 from the device list and also selects an item indicating 'display of the PIN code'. Thereby, the portable terminal 50 displays a predetermined PIN code (or a PIN code newly generated by the portable terminal 50) on the portable terminal 50. The user can know a PIN code (terminal) that should be input to the MFP 10, by seeing the PIN code (hereinafter, referred to as 'PIN code (terminal)') displayed on the portable terminal 50.

The user also selects an item indicating 'wireless connection of the WFD mode' in accordance with the screen displayed on the display unit 14 of the MFP 10, then selects an item indicating 'PIN code mode' and selects an item indicating 'input of PIN code'. Then, the user operates the operation unit 12 to thus input the PIN code (terminal) to the MFP 10. In the below, the series of operations, which are performed until the PIN code (terminal) is input, are referred to as 'PIN input operation'. When the PIN input operation is applied to the operation unit 12, the control unit 30 of the MFP 10 determines YES in S110 and executes the respective processing after S112.

The processing of S112 and S120 is the same as S12 and S20 of FIG. 2. In S114 (i.e., MFP 10=G/O), the first communication control unit 42 transmits a connection request (i.e., Association Request signal; hereinafter, referred to as 'PIN connection request') for requesting connection establishment of the PIN code mode.

When the PIN code (terminal) is displayed, the portable terminal 50 is shifted to a standby state of a PIN connection request. When a device (for example, the portable terminal 50) is at the standby state of the PIN connection request, the device can receive a PIN connection request and transmit an OK response (i.e., Association Response signal). On the other hand, when a device is not at the standby state of the PIN connection request, the device does not transmit an OK response even though it receives a PIN connection request (for example, it transmits a response indicating NG). Since the portable terminal 50 is shifted to the standby state of the PIN connection request, the portable terminal 50 receives the PIN connection request from the MFP 10 at the G/O state and transmits an OK response to the MFP 10.

In S116, the first communication control unit 42 receives the OK response from the portable terminal 50. Then, in S118 the first communication control unit 42 establishes connection between the MFP 10 at the G/O state and the portable terminal 50, like the processing of S18 that is executed via S14 to S16 of FIG. 2. As a result, the portable terminal 50 newly participates in the WFDNW (MFP 10=G/O).

During the communication of S118, the PIN code (terminal) is used. For example, the portable terminal 50 generates a first hash code from predetermined data (for example, data actually communicated between the MFP 10 and the portable terminal 50) by using the PIN code (terminal) displayed on the portable terminal 50 and transmits the first hash code to the MFP 10. The first communication control unit 42 of the MFP 10 generates a second hash code from the predetermined data by using the PIN code (terminal) input to the MFP 10 and compares the first hash code and the second hash code. When the first hash code and the second hash code coincide with each other, the first communication control unit 42 establishes connection of the PIN code mode between the MFP 10 and the portable terminal 50. Like this, in the PIN code mode, the authentication confirming whether the PIN code displayed on one device coincides with the PIN code input to the other device is executed. In this regard, the connection of the PIN code mode is different from the connection of the PBC mode. That is, the wireless connection mode of the PIN code mode is a mode in which the authentication of the PIN code (hereinafter, referred to as 'display PIN code') displayed on one device and the PIN code (hereinafter, referred to as 'input PIN code') input to the other device is executed. In the meantime, the wireless connection mode of the PBC mode is a mode in which the authentication of the display PIN code and the input PIN code is not executed. When the processing of S118 is over, the processing proceeds to S140.

Meanwhile, in S122 (i.e., MFP 10=device state), the control unit 30 transmits a PTN connection request and receives an OK response from the portable terminal 50, like S114 and S116. Then, like S22 of FIG. 2, the control unit 30 executes the G/O negotiation (S122) and establishes connection of the PIN code mode between the MFP 10 and the portable terminal 50 (S118). As a result, one of the MFP 10 and the portable terminal 50 newly establishes a WFDNW as a G/O device and the other participates in the WFDNW as a CL device.

Also, in S130 (i.e., MFP 10=CL state), the second transmission control unit 43 transmits a PIN state transition request, which includes the PIN code (terminal) input to the MFP 10, to the specific G/O device in accordance with the SNMP (in accordance with another protocol, in a modified embodiment). The PIN state transition request is a request for shifting a state of the specific G/O device to a state for establishing connection of the PIN code mode. More specifically, the PIN state transition request including the PIN code (terminal) is a request for shifting a state of the specific G/O device to a state of transmitting the PIN connection request to the portable terminal 50 (refer to S312 in FIG. 5).

When the specific G/O device receives the PIN state transition request including the PIN code (terminal) from the MFP 10, it transmits a PIN connection request (refer to S312 in FIG. 5).

As described above, when the PIN code (terminal) is displayed, the portable terminal 50 is shifted to the standby state of the PIN connection request. Therefore, the portable terminal 50 receives the PIN connection request from the specific G/O device and transmits an OK response to the specific G/O device.

Although the PIN input operation is not applied to the specific G/O device, since the specific G/O device receives the PIN state transition request from the MFP 10 at the CL state and is shifted to the state of transmitting the PIN connection request, a condition for performing WPS communication of the PIN code mode is satisfied. Therefore, the specific G/O device and the portable terminal 50 perform WPS communication and authentication communication by using the PIN code (terminal) (i.e., by executing the authentication of the display PIN code and the input PIN code). As a result, connection of the PIN code mode is established between the specific G/O device and the portable terminal 50. Thereby, the portable terminal 50 newly participates in the WFDNW (MFP 10=G/O), as a CL device. When the processing of S130 is over, the processing proceeds to S140. The processing of S140 and S142 is the same as S40 and S42 of FIG. 2.

(PIN Display Processing; FIG. 4)

The user selects an item indicating 'wireless connection of the WFD mode' in accordance with the screen displayed on the display unit 14 of the MFP 10, then selects an item indicating 'PIN code mode' and selects an item indicating 'display of PIN code'. In the below, the series of operations, which are performed until the item indicating the 'display of PIN code' is selected, are referred to as 'PIN display operation'. When the PIN display operation is applied to the operation unit 12, the control unit 30 of the MFP 10 determines YES in S210 and executes the respective processing after S212.

The processing of S212 and S220 is the same as S12 and S20 of FIG. 2. In S213 (i.e., MFP 10=G/O state), a display control unit 44 displays a PIN code predetermined for the MFP 10 (or a newly generated PIN code) on the display unit 14. The user can know a PIN code (MFP 10) that should be input to the portable terminal 50, by seeing the PIN code displayed on the MFP 10 (hereinafter, referred to as 'PIN code (MFP 10)'). Then, in S214, the first communication control unit 42 shifts the MFP 10 to the standby state of the PIN connection request.

The user also starts the application for MFP of the portable terminal 50 at the device state, thereby executing the PIN connection operation. Thereby, the portable terminal 50 executes the SLS to thus display the device list, which indicates the information relating to the MFP 10 at the GO state. The user selects the MFP 10 from the device list. The user also selects an item indicating 'input of PIN code' and inputs the PIN code (MFP 10) to the portable terminal 50. Thereby, the portable terminal 50 transmits a PIN connection request.

In S214, the MFP 10 at the C/O state is shifted to the standby state of the PIN connection request. Therefore, in S216, the first communication control unit 42 receives the PIN connection request from the portable terminal 50 and transmits an OK response to the portable terminal 50. Then, in S218, the first communication control unit 42 establishes connection of the PIN code mode between the MFP 10 at the G/O state and the portable terminal 50, like the processing of S118 that is executed via S114 to S116 of FIG. 3. As a result, the portable terminal 50 newly participates in the WFDNW (MFP 10=G/O) as a CL device. When the processing of S218 is over, the processing proceeds to S240.

Meanwhile, in S221 (i.e., MFP 10=device state), the display control unit 44 displays the PIN code (MFP 10) on the display unit 14, like the processing of S213. Then, in S222, the control unit 30 shifts the MFP 10 at the device state to the standby state of the PIN connection request, receives the PIN connection request from the portable terminal 50 and transmits an OK response to the portable terminal 50, like the processing of S214 and S216. Then, the control unit 30 executes the G/O negotiation (S222), like the processing of S22 in FIG. 2, and then establishes connection of the PIN code mode between the MFP 10 and the portable terminal 50 (S218). As a result, one of the MFP 10 and the portable terminal 50 newly establishes a WFDNW, as a G/O device, and the other participates in the WFDNW, as a CL device.

Also, in S230 (i.e., MFP 10=CL state), the second transmission control unit 43 transmits a PIN state transition request, which includes a PIN transmission request, to the specific G/O device in accordance with the SNMP (in accordance with another protocol, in a modified embodiment). The PIN transmission request is a command for requesting the specific G/O device to transmit a PIN code predetermined for the specific G/O device (or a PIN code newly generated in the specific G/O device) to the MFP 10. The PIN state transition request including the PIN transmission request is a request for shifting a state of the specific G/O device to the standby state of the PIN code mode (i.e., a state for responding an OK response to the PIN connection request; refer to S324, S326 in FIG. 5).

When the specific G/O device receives the PIN state transition request including the PIN transmission request from the MFP 10 at the CL state, it transmits a PIN code (hereinafter, referred to as 'PIN code (G/O)') to the MFP 10 (refer to S322 in FIG. 5). Also, the specific G/O device is shifted to the standby state of the PIN connection request (refer to S324 in FIG. 5).

In S231, the second transmission control unit 43 of the MFP 10 receives the PIN code (G/O) from the specific GO device. Then, in S232, the display control unit 44 displays the PIN code (G/O) on the display unit 14.

Also, the user starts the application for MFP of the portable terminal 50 at the device state, thereby inputting the PIN code (G/O) to the portable terminal 50. Thereby, the portable terminal 50 transmits a PIN connection request.

As described above, the specific G/O device is shifted to the standby state of the PIN connection request. Thus, the specific G/O device receives the PIN connection request from the portable terminal 50 and transmits an OK response to the portable terminal 50.

Although the PIN display operation is not applied to the specific G/O device, since the specific G/O device receives the PIN state transition request from the MFP 10 at the CL state and is shifted to the standby state of the PIN connection request, a condition for performing WPS communication of the PIN code mode is satisfied. Therefore, the specific G/O device and the portable terminal 50 perform WPS communication and authentication communication by using the PIN code (G/O) (i.e., by executing the comparison authentication of the display PIN code and the input PIN code). As a result, connection of the PIN code mode is established between the specific G/O device and the portable terminal 50. Thereby, the portable terminal 50 newly participates in the WFDNW (MFP=G/O), as a CL device. When the processing of S230 is over, the processing proceeds to S240. The processing of S240 and S242 is the same as S40 and S42 of FIG. 2.

(Request Monitoring Processing; FIG. 5)

When the MFP 10 is at the G/O state, the control unit 30 executes request monitoring processing of FIG. 5. The request monitoring processing is processing in which the MFP 10 at the G/O state monitors whether the state transition request (refer to S30 of FIG. 2, S130 of FIG. 3 and S230 of FIG. 4) is received from a device (for example, the MFP 100) at the CL state and establishes connection with a device (for example, the portable terminal 50) at the device state in accordance with the state transition request. In the below, the processing of FIG. 5 is described with reference to an example where the WFDNW to which the MFP 10 at the G/O state and the MFP 100 at the CL state belong is established.

In S300, a reception unit 45 monitors whether a PBC state transition request (refer to S30 in FIG. 5) is received. For example, when the MFP 100 at the CL state executes the processing of S30 in FIG. 2, the reception unit 45 receives a PBC state transition request from the MFP 100 at the CL state, determines YES in S300 and proceeds to S302. In S302, a participation unit 46 shifts the MFP 100 to the standby state of the PBC connection request. Then, in S304, the participation unit 46 receives a PBC connection request from the portable terminal 50 and transmits an OK response to the portable terminal 50. When the processing of S304 is over, the processing proceeds to S330.

In S310, the reception unit 45 monitors whether a PIN state transition request including a PIN code (refer to S130 in FIG. 3) is received. For example, when the MFP 100 at the CL state executes the processing of S130 of FIG. 3, the reception unit 45 receives a PIN state transition request including a PIN code from the MFP 100 at the CL state, determines YES in S310 and proceeds to S312. In S312, the participation unit 46 transmits a PBC connection request. Then, in S314, the participation unit 46 receives an OK response from the portable terminal 50. When the processing of S314 is over, the processing proceeds to S330.

In S320, the reception unit 45 monitors whether a PIN state transition request including a PIN transmission request (refer to S230 in FIG. 4) is received. For example, when the MFP 100 at the CL state executes the processing of S230 of FIG. 3, the reception unit 45 receives a PIN state transition request including a PIN transmission request from the MFP 100 at the CL state, determines YES in S320 and proceeds to S322. In S322, the participation unit 46 transmits a PIN code (MFP 10) to the MFP 100. Then, in S324, the participation unit 46 shifts the MFP 10 to the standby state of the PIN connection request. Then, in S326, the participation unit 46 receives a PIN connection request from the portable terminal 50 and transmits an OK response to the portable terminal 50. When the processing of S326 is over, the processing proceeds to S330.

In S330, the participation unit 46 performs WPS communication to thereby provide the WFDWSI (i.e., WFDWSI in the memory 34), which is currently used in the WFDNW (MFP 10=G/O), to the portable terminal 50. Then, the participation unit 46 performs authentication communication with the portable terminal 50 to thereby execute the authentication of the portable terminal 50. As a result, in the processing of S330 that is executed via S302 to S304, the participation unit 46 establishes connection of the PBC mode between the MFP 10 at the G/O state and the portable terminal 50. Also, in the processing of S330 that is executed via S312 to S314 or S322 to S326, the participation unit 46 establishes connection of the PIN code mode between the MFP 10 at the G/O state and the portable terminal 50. Thereby, the participation unit 46 can cause the portable terminal 50 to participate in the WFDNW (MFP 10=G/O).

Meanwhile, in the processing of S330 that is executed via S312 to S314, the participation unit 46 establishes the connection of the PIN code mode by using the PIN code (for example, the PIN code (terminal) of the portable terminal 50) included in the PIN state transition request received in S310 (i.e., by executing the authentication of the display PIN code and the input PIN code). Also, in the processing of S330 that is executed via S322 to S326, the participation unit 46 establishes the connection of the PIN code mode by using the PIN code (MFP 10) transmitted in S322 (i.e., by executing the authentication of the display PIN code and the input PIN code).

Then, in S332, the control unit 30 receives print data from the portable terminal 50. In this case, in S334, the control unit 30 transmits the print data to the MFP 100 at the CL state. That is, the control unit 30 relays the communication of the print data between the portable terminal 50 and the MFP 100. In other words, the MFP 100 at the CL state receives the print data from the portable terminal 50 at the CL state through the MFP 10 at the G/O state. Thereby, the MFP 100 can execute the printing processing, based on the print data.

(Specific Examples)

Subsequently, specific examples that are implemented by the MFPs 10, 100 and the portable terminal 50 are described with reference to FIGS. 6 to 9. The MFPs 10, 100 execute the respective processing of FIGS. 2 to 5, so that cases A to D of FIGS. 6 to 9 are implemented. The case A of FIG. 6 corresponds to a case (i.e., a case where the MFP 10 is at the G/O state) where a result of the determination in S12 of FIG. 2 is YES. The case B of FIG. 7 corresponds to a case (i.e., a case where the MFP 10 is at the CL state) where a result of the determination in S20 of FIG. 2 is NO. The case C of FIG. 8 corresponds to a case (i.e., a case where the MFP 10 is at the CL state) where a result of the determination in S120 of FIG. 3 is NO. The case D of FIG. 9 corresponds to a case (i.e., a case where the MFP 10 is at the CL state) where a result of the determination in S220 of FIG. 4 is NO.

(FIG. 6; Case A)

At an initial state of the case A in FIG. 6, the WFDNW (MFP 10=G/O) is established in which the MFP 10 is a G/O device and the MFP 100 is a CL device.

When a user wants the MFP 10 at the G/O state to execute a printing operation by using the portable terminal 50 at the device state, the user starts the application for MFP of the portable terminal 50 to thus apply a PBC connection operation to the portable terminal 50. In this case, the portable terminal 50 executes the SLS to thus display the device list indicating the information relating to the MFP 10 at the G/O state.

The user operates the portable terminal 50 to thus select the MFP 10 from the device list. In this case, the portable terminal 50 transmits a PBC connection request. In the meantime, the portable terminal 50 repeatedly transmits the connection request until an OK response is received or until a state where an OK response is not received continues for a predetermined time period.

The user applies a PBC connection operation to the operation unit 12 of the MFP 10 at the G/O state (YES in S10 of FIG. 2). In this case, the MFP 10 at the G/O state is shifted to the standby state of the PBC connection request (YES in S12, S14). Therefore, the MFP 10 at the G/O state receives the PBC connection request from the portable terminal 50 and transmits an OK response to the portable terminal 50 (Sl6).

Then, the MFP 10 at the G/O state performs WPS communication to thus supply the WFDWSI of the WFDNW (MFP 10=G/O) to the portable terminal 50 and performs authentication communication with the portable terminal 50 (S18). Thereby, the connection of the PBC mode is established between the MFP 10 at the G/O state and the portable terminal 50. As a result, the portable terminal 50 participates in the WFDNW (MFP 10=G/O), as a CL device.

The MFP 10 at the G/O state receives print data from the portable terminal 50 at the CL state, without going through the other apparatus (S40), and executes the printing processing, based on the print data (S42).

(FIG. 7; Case B)

At an initial state of the case B in FIG. 7, the WFDNW (MFP 10=CL) is established in which the MFP 10 is a CL device and the MFP 100 is a G/O device.

A user applies a PBC connection operation to the portable terminal 50 at the device state to thereby select the MFP 10 from the device list. In this case, the portable terminal 50 transmits a PBC connection request.

The user applies the PBC connection operation to the operation unit 12 of the MFP 10 at the CL state (YES in S10 of FIG. 2). In this case, the MFP 10 at the CL state transmits a PBC state transition request to the MFP 10 at the G/O state (NO in S20, S30).

As a result, the MFP 100 at the G/O state is shifted to the standby state of the PBC connection request (S302 in FIG. 5). Therefore, the MFP 100 at the G/O state receives the PBC connection request from the portable terminal 50 and transmits an OK response to the portable terminal 50 (S304).

Then, the MFP 100 at the G/O state performs WPS communication to thus supply the WFDWSI of the WFDNW (MFP 10=CL) to the portable terminal 50 and performs authentication communication with the portable terminal 50 (S330). Thereby, the connection of the PBC mode is established between the MFP 100 at the G/O state and the portable terminal 50. As a result, the portable terminal 50 participates in the WFDNW (MFP 10=CL), as a CL device.

The MFP 100 at the G/O state receives print data from the portable terminal 50 at the CL state (S332) and transmits the print data to the MFP 10 at the CL state (S334). As a result, the MFP 10 at the CL state receives the print data from the portable terminal 50 at the CL state through the MFP 100 at the G/O state (S40) and executes the printing processing, based on the print data (S42).

(FIG. 8; Case C)

An initial state of the case C in FIG. 8 is the same as that of the case B of FIG. 7. A user applies a PIN connection operation to the portable terminal 50 at the device state to thereby select the MFP 10 from the device list and an item indicating 'display of PIN code'. In this case, the portable terminal 50 displays the PIN code (terminal) and is shifted to the standby state of the PIN connection request.

The user applies a PIN input operation to the operation unit 12 of the MFP 10 at the CL state (YES in S10 of FIG. 2). That is, the user inputs the PIN code (terminal) displayed on the portable terminal 50 to the MFP 10 at the CL state. In this case, the MFP 10 at the CL state transmits a PBC state transition request including the PIN code (terminal) to the MFP 100 at the G/O state (NO in S120, S130).

As a result, the MFP 100 at the G/O state transmits a PIN connection request (S312 in FIG. 5). Thus, the MFP 100 at the G/O receives an OK response from the portable terminal 50 (S314).

Then, the MFP 100 at the G/O state performs WPS communication to thus supply the WFDWSI of the WFDNW (MFP 10=CL) to the portable terminal 50 and performs authentication communication with the portable terminal 50 by using the PIN code (terminal) (S330). Thereby, the connection of the PIN code mode is established between the MFP 100 at the G/O state and the portable terminal 50. As a result, the portable terminal 50 participates in the WFDNW (MFP 10=CL), as a CL device. The processing thereafter is the same as the case B of FIG. 7.

(FIG. 9; Case D)

An initial state of the case D in FIG. 9 is the same as those of the cases B and C of FIGS. 7 and 8. A user applies a PIN display operation to the portable terminal 50 at the CL state (YES in S210 of FIG. 4). In this case, the MFP 10 at the CL state transmits a PIN state transition request including a PIN transmission request to the MFP 100 at the G/O state (NO in S220, S230).

As a result, the MFP 100 at the G/O state transmits a PIN code (MFP 100) to the MFP 10 (S322 in FIG. 5) and is shifted to the standby state of the PIN connection request (S324).

The MFP 10 at the CL state receives the PIN code (MFP 100) from the MFP 100 at the G/O state (S231 in FIG. 4) and displays the PIN code (MFP 100) (S232).

The user applies a PIN connection operation to the portable terminal 50 at the device state to thereby select the MFP 10 from the device list and an item indicating 'input of PIN code'. Then, the user inputs the PTN code (MFP 100) displayed on the MFP 10 at the CL state to the portable terminal 50. That is, in the case D of FIG. 9, since the MFP 10 is at the CL state (NO in S220 of FIG. 4), the PIN code (MFP 100) that is a PIN code of the MFP 100 is displayed on the MFP 10 (S232 in FIG. 4). Therefore, even though the user selects the MFP 10 from the device list, the user inputs the PIN code (MFP 100) to the portable terminal 50. If the MFP 10 is at the G/O state, the PIN code (MFP 10) that is a PIN code of the MFP 10 is displayed on the MFP 10 (S213 in FIG. 4). Therefore, the user inputs the PIN code (MFP 10) to the portable terminal 50. Like this, even though the MFP 10 is at the G/O state or at the CL state, when the user inputs the PIN code, which is displayed on the MFP 10, to the portable terminal 50, the portable terminal 50 can be caused to participate in the WFDNW. That is, the user doesn't have to be conscious of inputting the PIN code (MFP 10) or PIN code (MFP 100) and has only to execute the same operation (i.e., the input operation of the PIN code that is displayed on the MFP 10) in any situation.

When the PIN code (MFP 100) is input, the portable terminal 50 transmits a PIN connection request. As a result, the MFP 100 at the G/O state receives the PIN connection request and transmits an OK response to the portable terminal 50 (S326 in FIG. 5). Then, the MFP 100 at the G/O state performs WPS communication to thus supply the WFDWSI of the WFDNW (MFP 10=CL) to the portable terminal 50 and performs authentication communication with the portable terminal 50 by using the PIN code (MFP 100) (S330). Thereby, the connection of the PIN code mode is established between the MFP 100 at the G/O state and the portable terminal 50. As a result, the portable terminal 50 participates in the WFDNW (MFP 10=CL), as a CL device. The processing thereafter is the same as the cases B and C of FIGS. 7 and 8.

(Effects of Illustrative Embodiment)

At the state (for example, the case A of FIG. 6) where the MFP 10 belongs to the WFDNW (MFP 10=G/O), as a G/O device, when the PBC connection operation, the PIN input operation or PIN display operation is executed (YES in S10 of FIG. 2, YES in S110 of FIG. 3, YES in S210 of FIG. 4), the MFP 10 performs communication for enabling the portable terminal 50 to participate in the WFDNW (MFP 10=G/O) (S16 to S18 of FIG. 2, S114 to S118 of FIG. 3, S216 to S218 of FIG. 4). Thereby, the MFP 10 can cause the portable terminal 50 to participate in the WFDNW (MFP 10=G/O). Then, the MFP 10 can receive the print data from the portable terminal 50 by using the WFDNW (MFP 10=G/O), without going through the other apparatus.

In the meantime, at the state (for example, the cases B to D of FIGS. 7 to 9) where the MFP 10 belongs to the WFDNW (MFP 10=G/O), as a CL device, when the PBC connection operation, the PIN input operation or PIN display operation is executed (NO in S20 of FIG. 2, NO in S120 of FIG. 3, NO in S220 of FIG. 4), the MFP 10 transmits the state transition request to the MFP 100 at the G/O state (S30 of FIG. 2, S130 of FIG. 3, S230 of FIG. 4). Thereby, the MFP 10 at the G/O state performs communication for enabling the portable terminal 50 to participate in the WFDNW (MFP 10=CL) (S304, S312 to S314, S326 and S330 of FIG. 5). That is, the MFP 10 at the CL state can cause the portable terminal 50 to participate in the WFDNW (MFP 10=CL) by transmitting the state transition request to the MFP 100 at the G/O state. Like this, the MFP 10 at the CL state can appropriately cause the portable terminal 50 to participate in the WFDNW (MFP 10=CL) even in the situation where it does not have the authority of establishing the connection between the MFP 10 and the portable terminal 50, i.e., the authority of enabling the portable terminal 50 to participate in the WFDNW (MFP 10=CL). Then, the MFP 10 at the CL state can receive the print data from the portable terminal 50 at the CL state by using the WFDNW (MFP 10=CL), through the MFP 100 at the G/O state.

Like this, the MFP 10 can appropriately cause the portable terminal 50 to participate in the WFDNW to which the MFP 10 belongs, by executing the processing depending on whether the MFP 10 is at the G/O state or at the CL state. As a result, the MFP 10 can appropriately receive the print data from the portable terminal 50.

Also, the MFP 10 can execute the same operation as the MFP 100 at the G/O state of the cases B to D of FIGS. 7 to 9. That is, at the state where the MFP 10 belongs to the WFDNW (MFP 10=G/O), as a G/O device, when the PBC connection operation, the PIN input operation or PIN display operation is executed for the MFP 100 at the CL state, the MFP 10 receives the state transition request from the MFP 100 at the CL state (YES in S300, YES in S310 and YES in S320 of FIG. 5). In this case, the MFP 10 at the G/O state performs communication for enabling the portable terminal 50 to participate in the WFDNW (MFP 10=G/O) (S304, S312 to S314, S326 and S330). Thereby, the MFP 10 at the G/O state can cause the portable terminal 50 to participate in the WFDNW (MFP 10=G/O). As a result, the MFP 10 at the G/O state can receive the print data from the portable terminal 50 and transmit the print data to the MFP 100 at the CL state (S332, S334).

(Correspondence Relation)

The MFP 10 and the portable terminal 50 are examples of the 'communication apparatus' and the 'target apparatus', respectively. The WFDNW established in the cases A to D of FIGS. 6 to 9 is an example of the 'specific wireless network'. The 'G/O state', the 'CL state', the 'G/O device' and the 'CL device' are examples of the 'the master station state', the 'slave station state', the 'master station apparatus' and the 'slave station apparatus', respectively. The PBC connection operation, the PIN input operation and the PIN display operation are examples of the 'specific instruction'. The PBC mode and the PIN code mode are examples of the 'first wireless connection mode' and the 'second wireless connection mode', respectively. The PBC connection operation and the PIN input operation (or PIN display operation) are examples of the 'first operation' and the 'second operation', respectively. The print data is an example of the 'target data'. The case A of FIG. 6 and the case B of FIG. 7 (or the cases C and D of FIGS. 8 and 9) are examples of the 'first case' and the 'second case', respectively.

The PIN code (terminal) that is input in S110 of FIG. 3, the PIN code (MFP 10) that is displayed in S213 or S221 of FIG. 4 and the PIN code (G/O) that is displayed in S232 of FIG. 4 are examples of the 'first PIN code', the 'second PIN code' and the 'third PIN code', respectively. S16 to S18 of FIG. 2, S114 to S118 of FIG. 3 and S216 to S218 of FIG. 4 are examples of the 'first type communication'. S304, S312 to S314, S326 and S330 of FIG. 5 are examples of the 'second type communication' and the 'specific communication', respectively Although the specific illustrative embodiments of the invention have been specifically described, they are just exemplary and do not limit the claims. The technology defined in the claims includes a variety of modifications and changes to the above illustrative embodiments. In the following, modified embodiments of the above illustrative embodiments are enumerated.

(Modified Embodiment 1)

The 'target data' may be scan data, other than the print data. In this modified embodiment, for example, the first communication control unit 42 (or second communication control unit 43) causes the scan execution unit 18 to execute the scanning to thus generate scan data and transmits the scan data to the portable terminal 50, instead of S40 and S42 of FIG. 2, S140 and S142 of FIG. 3 and S240 and S242 of FIG. 4. In the meantime, the 'target data' may be data (for example, voice data, moving picture data and the like) different from the print data and the scan data.

(Modified Embodiment 2)

The 'master station state' is not limited to the G/O state of the WFD mode and may be any state insomuch as it is a state managing respective devices belonging to a wireless network (for example, a state capable of relaying wireless communication between respective devices belonging to a wireless network). Also, the 'slave station state' is not limited to the CL state of the WFD mode and may be any state insomuch as it is a state that is managed by a device at the master station state of the wireless network.

(Modified Embodiment 3)

The MFP 10 may not support both the PBC mode and the PIN code mode and may support at least one of the PBC mode and the PIN code mode. For example, when the MFP 10 supports only the PBC mode, the MFP 10 may not execute the processing of FIG. 3, the processing of FIG. 4 and the processing of S310 to S326 in FIG. 5.

(Modified Embodiment 4)

The 'communication apparatus' is not limited to the MFP 10 and may be other communication apparatus (for example, a printer, a scanner, a FAX apparatus, a copier, a phone, a desktop PC, a notebook PC, a tablet PC, a server, a portable phone, a PDA terminal and the like). Also, the 'target apparatus' is not limited to the portable terminal 50 and may be other communication apparatus (for example, an MFP, a printer, a scanner, a FAX apparatus, a copier, a phone, a desktop PC and the like).

(Modified Embodiment 5)

In the above illustrative embodiment, the CPU 32 of the MFP 10 executes the programs (i.e., software) in the memory 34, thereby implementing the respective units 41 to 46. Instead of this, at least one of the respective units 41 to 46 may be implemented by hardware such as a logical circuit and the like.

Also, the technical elements illustrated in the specification or drawings exhibit the technical availability individually or by a variety of combinations thereof and are not limited to the combinations defined in the claims at the time of filing the application. Also, the technology exemplified in the specification or drawings achieves a plurality of purposes at the same time and the achievement of any one purpose has the technical availability.

What is claimed is:

1. A communication apparatus comprising:

a processor; and memory storing instructions that, when executed by the processor, cause the processor to perform:

determining a current state of the communication apparatus when a specific instruction to enable a target apparatus to participate in a specific wireless network is provided at a state where the communication apparatus belongs to the specific wireless network, wherein the current state of the communication apparatus is one of a plurality of states including a master station state and a slave station state, the master station state being a state where the communication apparatus operates as a master station of the specific wireless network, the slave station state being a state where the communication apparatus operates as a slave station of the specific wireless network;

controlling a first communication to perform a first type communication with the target apparatus to enable the target apparatus to participate in the specific wireless network in a first case where it is determined that the current state of the communication apparatus is the master station state, thereby establishing a first specific network between the target apparatus and the communication apparatus; and controlling a second communication to transmit a communication request to a master station apparatus operated as the master station of the specific wireless network in a second case where it is determined that the current state of the communication apparatus is the slave station state, thereby performing communication with the target apparatus via the master station apparatus by using a second specific network among the master station apparatus, the communication apparatus, and the target apparatus, wherein the communication request is a request to perform a second type communication between the master station apparatus and the target apparatus to enable the target apparatus to participate in the second specific network.

2. The communication apparatus according to claim 1,
wherein the specific instruction is provided when a first operation based on a first wireless connection mode is applied to the communication apparatus,
wherein the first wireless connection mode is a mode to establish a wireless connection between a pair of devices when a predetermined operation is executed in each of the pair of devices, even though a PIN code is not input by a user,
wherein the first type communication includes communication to establish a wireless connection of the first wireless connection mode between the communication apparatus and the target apparatus, and
wherein the second type communication includes communication to establish a wireless connection of the first wireless connection mode between the master station apparatus and the target apparatus.

3. The communication apparatus according to claim 1,
wherein the specific instruction is provided when a second operation based on a second wireless connection mode is applied to the communication apparatus,
wherein the second wireless connection mode is a mode to establish a wireless connection between a pair of devices when a PIN code, which is displayed on one of the pair of devices, is input to another of the pair of devices,
wherein the first type communication includes communication to establish a wireless connection of the second wireless connection mode between the communication apparatus and the target apparatus, and
wherein the second type communication includes communication to establish a wireless connection of the second wireless connection mode between the master station apparatus and the target apparatus.

4. The communication apparatus according to claim 3,
wherein the second operation comprises an operation in which a first PIN code, which is prepared and displayed by the target apparatus, to be input in the communication apparatus,
wherein in the second case, the instructions, when executed by the processor, further cause the processor to perform: transmitting the communication request including the first PIN code to the master station apparatus, and
wherein the second type communication includes communication to establish a wireless connection of the second wireless connection mode between the master station apparatus and the target apparatus by using the first PIN code.

5. The communication apparatus according to claim 3,
wherein the second operation includes an operation for displaying a second PIN code, which is prepared by the communication apparatus, on a display unit of the communication apparatus,
wherein the instructions, when executed by the processor, further cause the processor to perform:
controlling to display the second PIN code on the display unit in the first case,
wherein the first type communication includes communication to establish a wireless connection of the second wireless connection mode between the communication apparatus and the target apparatus, by using the second PIN code,
wherein in the second case, the instructions, when executed by the processor, further cause the processor to perform:
transmitting the communication request to the master station apparatus and receives a third PIN code, which is prepared by the master station apparatus, from the master station apparatus,
wherein in the second case, the instructions, when executed by the processor, further cause the processor to perform:
displaying the third PIN code on the display unit, and
wherein the second type communication includes communication to establish a wireless connection of the second wireless connection mode between the master station apparatus and the target apparatus by using the third PIN code.

6. The communication apparatus according to claim 1,
wherein in the first case, after the instructions further cause the processor to perform the first type communication with the target apparatus, the instructions further cause the processor to perform:
a communication of target data with the target apparatus participating in the specific wireless network without going through another apparatus, and
wherein in the second case, after the instructions further cause the processor to perform transmitting the communication request to the master station apparatus, the instructions further cause the processor to perform:
communication of the target data with the target apparatus participating in the specific wireless network through the master station apparatus.

7. The communication apparatus according to claim 1,
wherein the first type communication includes a communication so that the communication apparatus provides wireless setting information, which is currently used in the specific wireless network, to the target apparatus, and
wherein the second type communication includes a communication so that the master station apparatus provides the wireless setting information to the target apparatus.

8. A communication apparatus comprising:
a processor; and
non-transitory memory storing instructions that, when executed by the processor, cause the processor to perform:
receiving a communication request from a slave station of a specific wireless network at a state where the communication apparatus operates as a master station and belongs to the specific wireless network, thereby performing communication with a target apparatus by using a specific network among the slave station, the communication apparatus, and the target apparatus,
wherein the communication request is a request to perform specific communication between the communication apparatus and the target apparatus to enable the target apparatus to participate in the specific wireless network; and
controlling to perform the specific communication to enable the target apparatus to participate in the specific wireless network when the communication request is received.

9. A non-transitory computer-readable medium having instructions to control a processor mounted on a communication apparatus to perform operations comprising:
determining a current state of the communication apparatus when a specific instruction to enable a target apparatus to participate in a specific wireless network is provided at a state where the communication apparatus belongs to the specific wireless network, wherein the current state of the communication apparatus is one of a plurality of states including a master station state and a slave station state, the master station state being a state where the communication apparatus operates as a master station of the specific wireless network, the slave station state being a state where the communication apparatus operates as a slave station of the specific wireless network;

controlling a first communication to perform a first type communication with the target apparatus to enable the target apparatus to participate in the specific wireless network in a first case where it is determined that the current state of the communication apparatus is the master station state, thereby establishing a first specific network between the target apparatus and the communication apparatus; and controlling a second communication to transmit a communication request to a master station apparatus operated as the master station of the specific wireless network in a second case where it is determined that the current state of the communication apparatus is the slave station state, thereby performing communication with the target apparatus via the master station apparatus by using a second specific network among the master station apparatus, the communication apparatus, and the target apparatus, wherein the communication request is a request to perform a second type communication between the master station apparatus and the target apparatus to enable the target apparatus to participate in the second specific network.

10. A non-transitory computer-readable medium having instructions to control a processor on a communication apparatus to perform operations comprising:

receiving a communication request from a slave station of a specific wireless network at a state where the communication apparatus operates as a master station and belongs to the specific wireless network, thereby performing communication with a target apparatus by using a specific network among the slave station, the communication apparatus, and the target apparatus, wherein the communication request is a request to perform specific communication between the communication apparatus and the target apparatus to enable the target apparatus to participate in the specific wireless network; and controlling to perform the specific communication to enable the target apparatus to participate in the specific wireless network when the communication request is received.

* * * * *